United States Patent
Gandhi et al.

(10) Patent No.: US 12,059,803 B2
(45) Date of Patent: Aug. 13, 2024

(54) CONVEYOR SYSTEM WITH MULTIPLE ROBOT SINGULATORS AND BUFFERING CONVEYOR

(71) Applicant: Material Handling Systems, Inc., Mt. Washington, KY (US)

(72) Inventors: Varun Gandhi Mukesh Gandhi, Louisville, KY (US); Thomas Anthony Hillerich, Jr., Louisville, KY (US); Madhav Devidas Patil, Louisville, KY (US); Paul Receveur, New Albany, IN (US); Jonathan Dean Terrell, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 166 days.

(21) Appl. No.: 17/941,735

(22) Filed: Sep. 9, 2022

(65) Prior Publication Data

US 2023/0001569 A1 Jan. 5, 2023

Related U.S. Application Data

(63) Continuation-in-part of application No. 17/325,719, filed on May 20, 2021, now Pat. No. 11,753,256.
(Continued)

(51) Int. Cl.
*B25J 9/00* (2006.01)
*B25J 9/16* (2006.01)
(Continued)

(52) U.S. Cl.
CPC .......... *B25J 9/0093* (2013.01); *B25J 9/1682* (2013.01); *B25J 9/1697* (2013.01); *B25J 13/08* (2013.01);
(Continued)

(58) Field of Classification Search
CPC ...... B65G 47/907; B65G 47/90; B65G 47/52; B65G 47/31; B65G 43/08; B65G 47/91; B65G 47/905; B25J 9/0093; B25J 9/1679
(Continued)

(56) References Cited

U.S. PATENT DOCUMENTS 5,040,056 A * 8/1991 Sager ..................... B25J 9/0093
901/8
5,908,283 A * 6/1999 Huang ................. G06Q 10/043
414/21

(Continued)

FOREIGN PATENT DOCUMENTS

JP 2015-040118 A 3/2015
JP 2020-172402 A 10/2020
(Continued)

OTHER PUBLICATIONS

Korean Intellectual Property Office, International Search Report and Written Opinion issued in Application No. PCT/US2022/043071, mailed Feb. 10, 2023.
(Continued)

*Primary Examiner* — James R Bidwell
(74) *Attorney, Agent, or Firm* — Stites & Harbison, PLLC; David W. Nagle, Jr.; Gary N. Stewart

(57) ABSTRACT

A conveyor system includes a first robot singulator, a second robot singulator, and a picking area from which parcels of a bulk flow of parcels can be engaged and transferred by the first robot singulator or the second robot singulator. The conveyor system further includes a first place conveyor positioned downstream of the picking area and configured to receive parcels transferred by the first robot singulator. The conveyor system further includes a second place conveyor positioned downstream of the picking area and the first place conveyor, the second place conveyor configured to receive parcels transferred by the second robot singulator and to
(Continued)

receive parcels from the first place conveyor. A buffering conveyor is positioned between the first place conveyor and the second place conveyor for regulating a rate at which parcels offloaded by the first place conveyor are transferred to the second place conveyor.

16 Claims, 19 Drawing Sheets

Related U.S. Application Data

(60) Provisional application No. 63/343,765, filed on May 19, 2022, provisional application No. 63/042,145, filed on Jun. 22, 2020.

(51) Int. Cl.
  *B25J 13/08* (2006.01)
  *B65G 43/08* (2006.01)
  *B65G 47/31* (2006.01)
  *B65G 47/90* (2006.01)

(52) U.S. Cl.
  CPC ............. *B65G 43/08* (2013.01); *B65G 47/31* (2013.01); *B65G 47/90* (2013.01); *B65G 47/905* (2013.01)

(58) Field of Classification Search
  USPC ........................................... 198/347.1–347.4
  See application file for complete search history.

(56) References Cited

U.S. PATENT DOCUMENTS

| | | | |
|---|---|---|---|
| 7,051,863 B2* | 5/2006 | Fujimura | .......... H01L 21/67766 198/341.01 |
| 10,906,188 B1 | 2/2021 | Sun et al. | |
| 10,954,081 B1 | 3/2021 | Sun et al. | |
| 11,753,256 B2* | 9/2023 | Patil | ........................ B25J 9/0018 198/444 |
| 2014/0332344 A1 | 11/2014 | Jodoin et al. | |
| 2021/0122054 A1 | 4/2021 | Sun et al. | |
| 2021/0122586 A1 | 4/2021 | Sun et al. | |
| 2021/0395023 A1* | 12/2021 | Patil | ........................ B25J 19/023 |

FOREIGN PATENT DOCUMENTS

| | | |
|---|---|---|
| KR | 10-2021-0062107 A | 5/2021 |
| WO | 2018/005367 A1 | 1/2018 |
| WO | 2018/200503 A1 | 11/2018 |
| WO | 2018/226773 A1 | 12/2018 |

OTHER PUBLICATIONS

Canadian Intellectual Property Office, Examiner's Report issued in corresponding Application No. 3,186,002 dated Apr. 24, 2024.
European Patent Office, Supplementary European Search Report issued in corresponding Application No. EP 21828293 mailed Jun. 20, 2024.

* cited by examiner

CONVEYOR SYSTEM WITH MULTIPLE ROBOT SINGULATORS AND BUFFERING CONVEYOR

CROSS-REFERENCE TO RELATED APPLICATIONS

The present application is a continuation-in-part of U.S. patent application Ser. No. 17/325,719 filed on May 20, 2021, which claims priority to U.S. Patent Application Ser. No. 63/042,145 filed on Jun. 22, 2020, the entire disclosures of which are incorporated herein by reference.

The present application also claims priority to U.S. Patent Application Ser. No. 63/343,765 filed on May 19, 2022, the entire disclosure of which is incorporated herein by reference.

BACKGROUND OF THE INVENTION

The present invention relates to the handling of parcels within a sorting or similar facility. In particular, the present invention relates to a conveyor system which includes multiple robot singulators for transferring parcels from a bulk flow into a singulated stream of parcels.

In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels. However, there are certain deficiencies in such prior art systems. For example, a surge in the volume of parcels may overwhelm the mechanical systems, and parcels may not be fully singulated. Non-singulated parcels may then interfere with subsequent processing, including downstream sorting.

U.S. Pat. No. 10,646,898, which is incorporated herein by reference, thus describes a system and method for identifying and transferring parcels from a bulk flow of parcels on the first conveyor (or "pick conveyor") to a singulated stream of parcels on the second conveyor (or "place conveyor"). Specifically, a robot singulator (or robot) receives parcels via the pick conveyor, engages each parcel, and then places it onto the place conveyor. However, due to cycle time limitations (i.e., the time required for each iterative transfer of a parcel from the pick conveyor to the place conveyor), conveyor systems including only a single robot singulator may not always be capable of providing the necessary throughput required to efficiently process large parcel volumes.

Accordingly, there remains a need for improved systems for transferring parcels from a bulk flow into a singulated stream of parcels.

SUMMARY OF THE INVENTION

The present invention is a conveyor system, which includes multiple robot singulators (or robots) for transferring parcels from a bulk flow into a singulated stream of parcels.

An exemplary conveyor system made in accordance with the present invention includes: a pick conveyor defining a picking area for a bulk flow of parcels; a place conveyor positioned downstream of the picking area; a first robot singulator (or first robot) and a second robot singulator (or second robot), which work in parallel to transfer parcels within the picking area into a singulated stream on the place conveyor; and a vision and control subsystem that is operably connected to the first robot and the second robot, such that the vision and control subsystem can communicate instructions to control operation of such components.

The vision and control subsystem includes a first (or target) camera configured to acquire one or more images of a predetermined region of interest (i.e., the picking area) and any parcels located therein. In some embodiments, the target camera is positioned so that that the field of view of the target camera includes the picking area as well as at least a portion of the pick conveyor located upstream of the picking area. Each image acquired by the target camera is processed within the vision and control subsystem to determine the location of parcels positioned within the picking area, if any, and, in some embodiments, the proximity of such parcels relative to each other and/or the position of one or more parcels located upstream of the picking area. Based on the determined location of the parcels within the picking area, the vision and control subsystem communicates instructions which cause the first robot and the second robot to successively transfer the parcels within the picking area to the place conveyor.

In some embodiments, following transfer of a parcel from the picking area to the place conveyor, the vision and control subsystem communicates instructions which cause the place conveyor to be indexed, thereby creating room on the place conveyor for other parcels to be delivered. As it is not necessary for one parcel to be fully transferred from the picking area to the place conveyor before the transfer process of another parcel within the picking area commences, the parcel transfer throughput rate exhibited by the system of the present invention is thus improved relative to that of known conveyor systems including only a single robot singulator.

To reduce system downtime associated with parcel transfer from the picking area to the place conveyor, in some embodiments, the system includes a parcel transfer routine, which includes a robot selection subroutine that causes the vision and control subsystem to select either the first robot or the second robot to transfer a parcel within the picking area based on a priority queue including one or more entries assigning priority to either the first robot or the second robot, while also taking into account the availability of the first robot and the second robot. In instances where multiple parcels are positioned in the picking area, the robot selection subroutine may also cause the vision and control subsystem to select one parcel of the multiple parcels for transfer by the selected robot based on the proximity of the parcels within the multiple parcels to the selected robot. To reduce system downtime associated with image acquisition and processing, in some embodiments, the vision and control subsystem limits the number of times the target camera is selectively activated to acquire images of a grouping of multiple parcels located within the picking area at a given time based on the spacing of such parcels relative to each other.

In some embodiments, the parcel transfer routine includes a parcel pick and index subroutine that is selectively executed to reduce system downtime associated with the transfer of parcels positioned upstream of the picking area of the pick conveyor to the picking area. The pick and index subroutine reduces such downtime by causing the pick conveyor to be indexed a calculated distance to move a parcel located upstream of the picking area into the picking area immediately following (i.e. substantially simultaneously with) another parcel being removed from the picking area by either the first robot or the second robot. In some embodiments, the calculated distance is based on image data corresponding to an image acquired by the target camera. In some embodiments, the system may further include a sensor configured to acquire readings regarding the presence of parcels within the picking area of the pick conveyor. In some embodiments, indexing of the pick conveyor may be stopped in response to the sensor obtaining readings which indicate the presence of one or more parcels within the picking area.

In some embodiments, the vision and control subsystem further includes a second (or confirm camera) configured to acquire images of an area of the place conveyor (or place area) in which parcels transferred from the picking area are delivered. Each image acquired by the confirm camera is processed within the vision and control subsystem to confirm proper transfer of a parcel to the place conveyor. In determining whether a parcel was properly transferred to the place conveyor, in some embodiments, the vision and control subsystem may be configured to determine whether multiple parcel were simultaneously transferred by the first robot or the second robot at a single time and/or whether a parcel transferred to the place conveyor is oriented in a manner which satisfies one or more predetermined criteria.

In some embodiments, the place conveyor includes multiple conveyors.

In some embodiments, the system includes an upstream conveyor configured to receive and convey a bulk flow of parcels downstream toward the picking area. In some embodiments, the upstream conveyor includes multiple conveyors.

DETAILED DESCRIPTION OF THE INVENTION

The present invention is a conveyor system, which includes multiple robot singulators (or robots) for transferring parcels from a bulk flow into a singulated stream of parcels.

Figure 1:
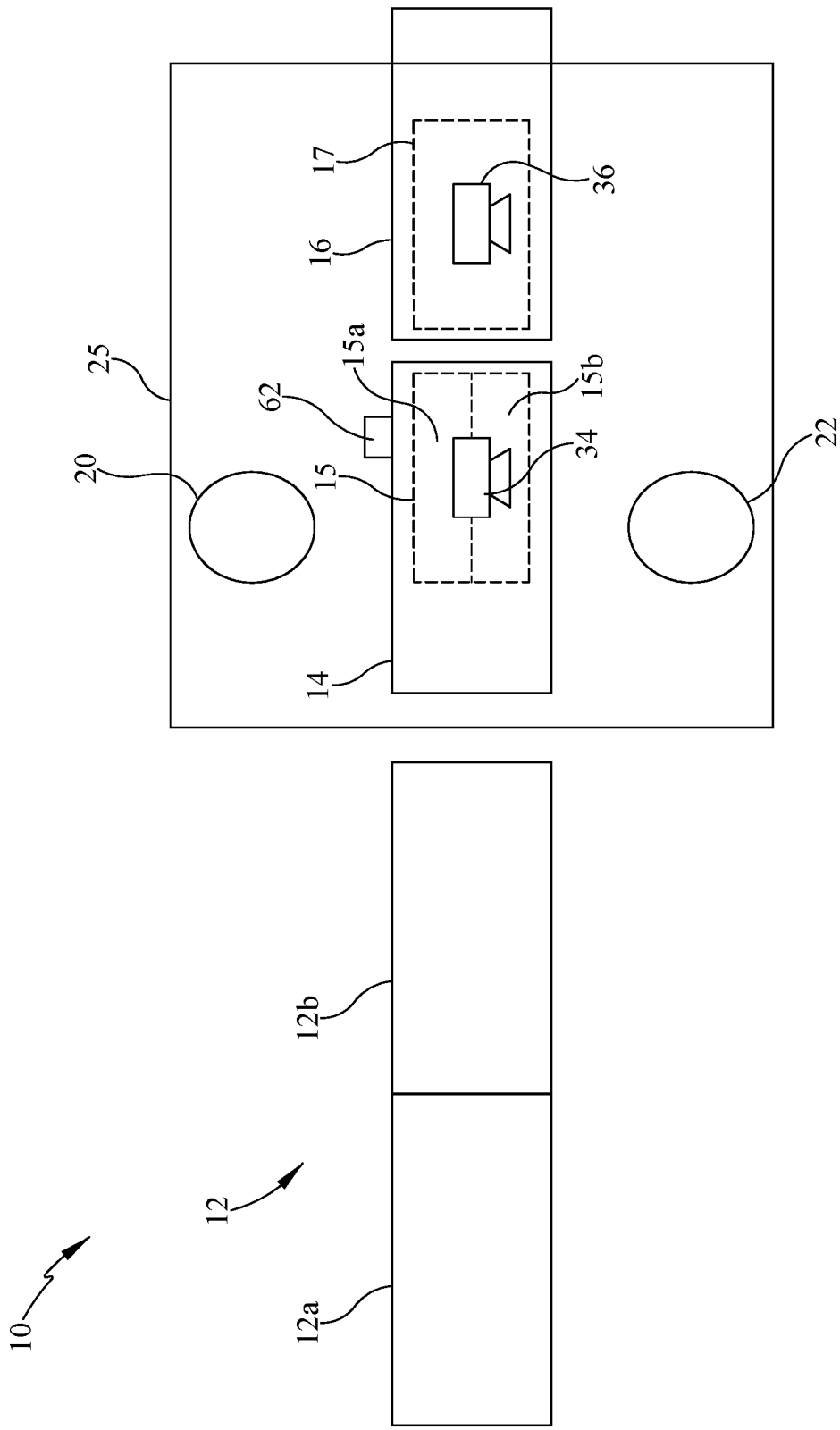
FIG. 1 is a schematic diagram of an exemplary conveyor system, which includes multiple robot singulators, made in accordance with the present invention.

FIG. 1 is a schematic diagram of an exemplary conveyor system 10, which includes multiple robot singulators, made in accordance with the present invention.

Figure 2:
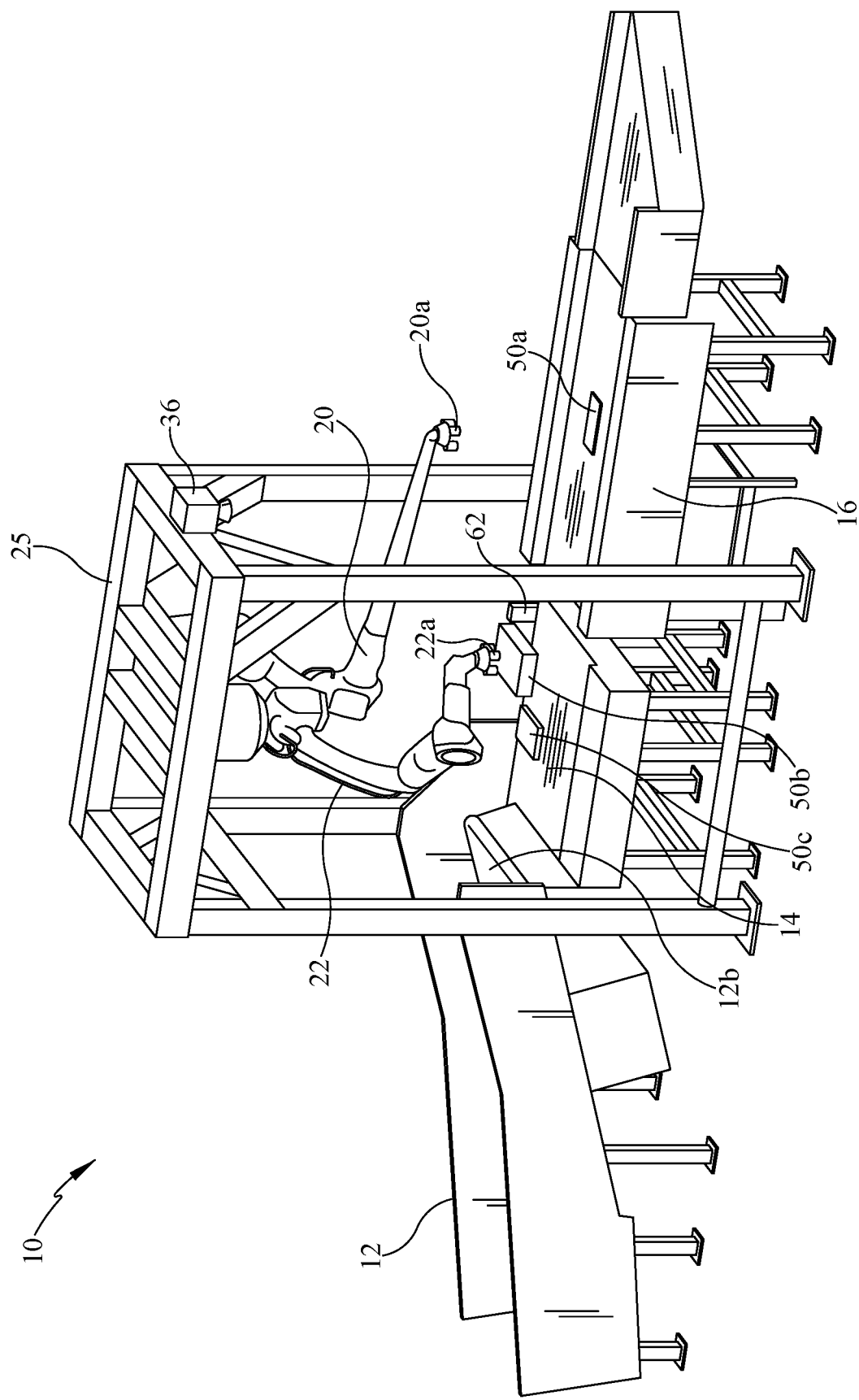
FIG. 2 is a perspective view of the exemplary conveyor system of FIG. 1.
Figure 3:
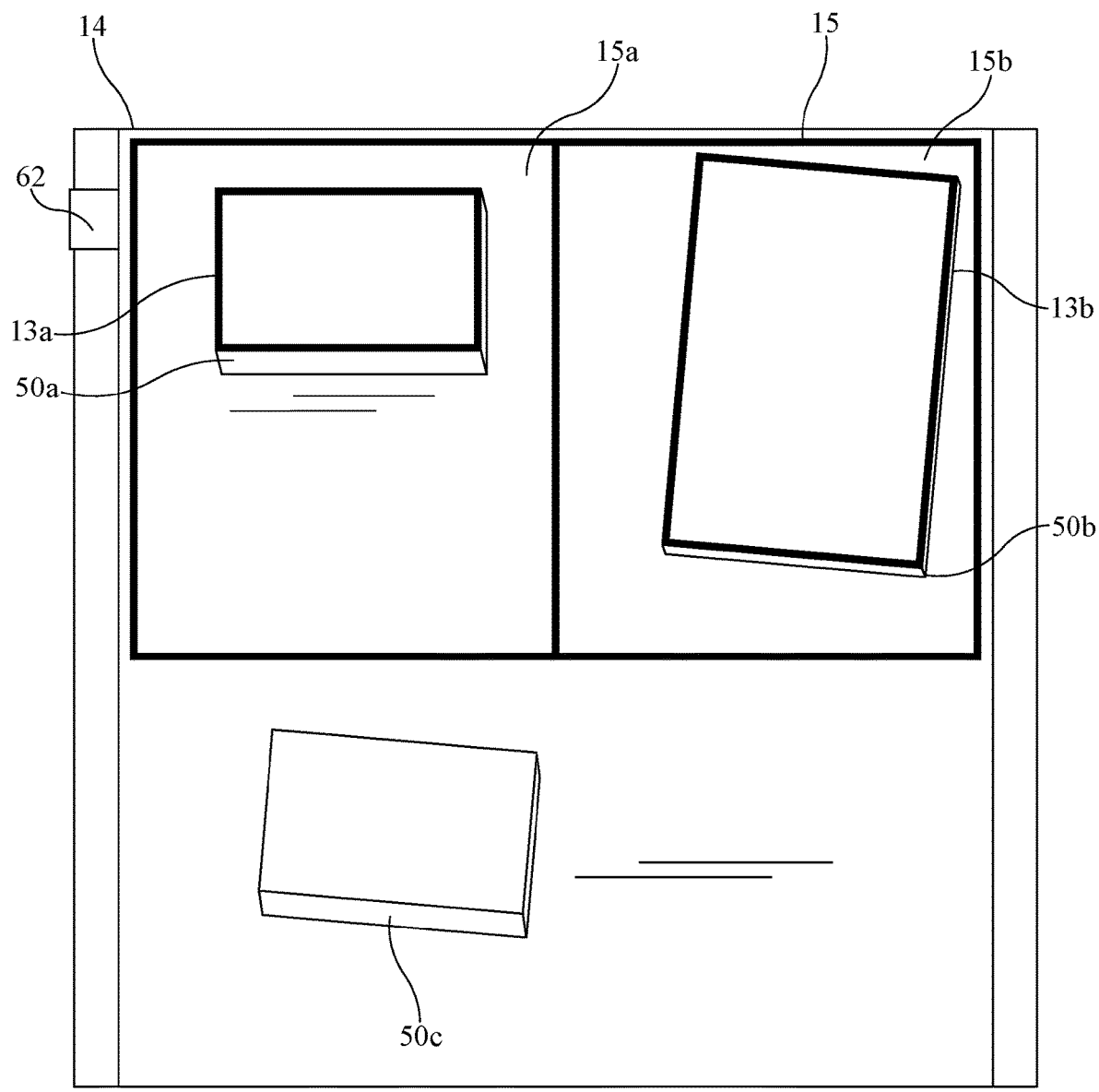
FIG. 3 is a top view of a pick conveyor of the exemplary conveyor system of FIG. 1.
Figure 5:
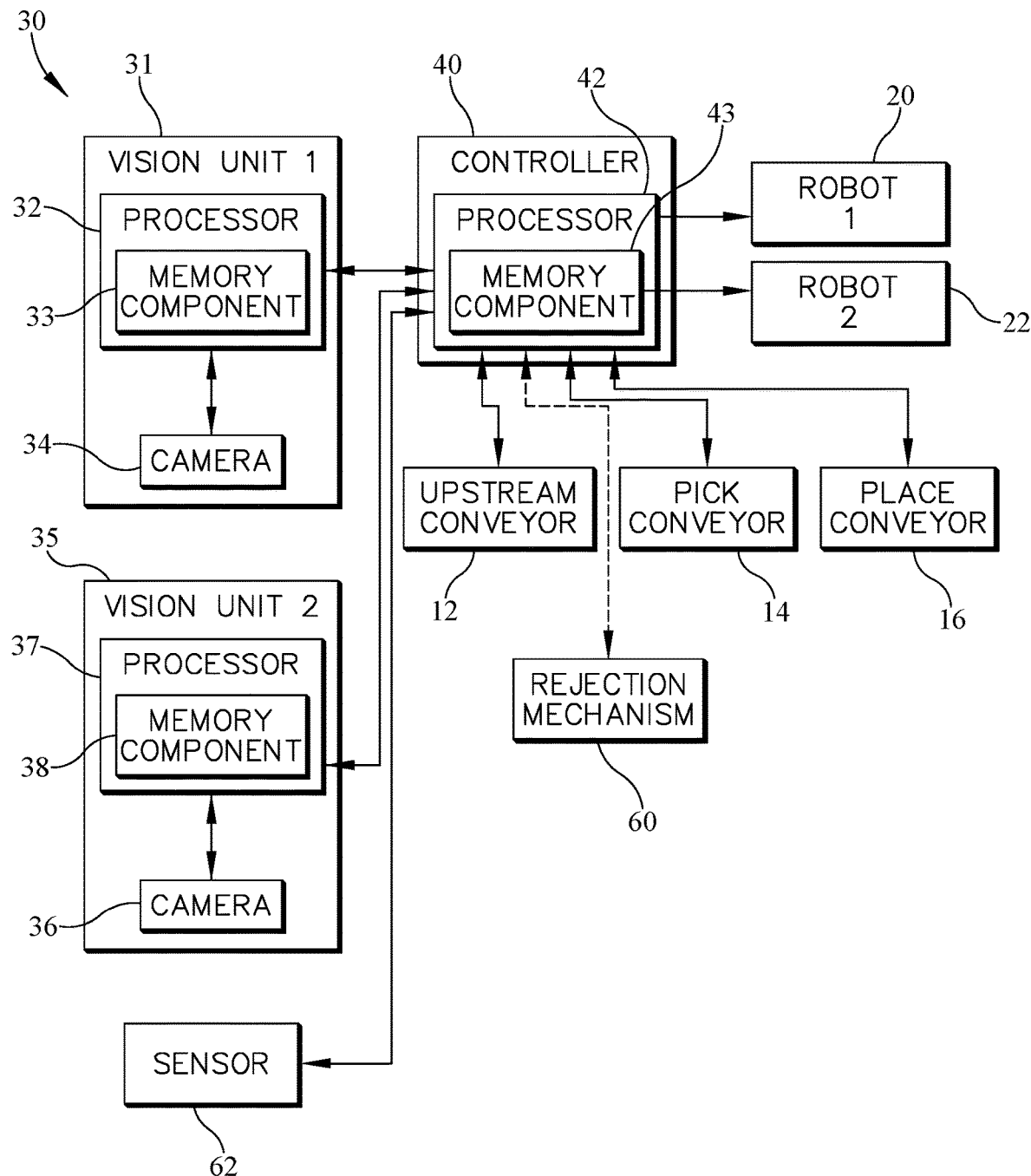
FIG. 5 is a schematic diagram of a vision and control subsystem for use in the exemplary conveyor system of FIG. 1.

FIG. 2 is a perspective view of the exemplary system 10 of FIG. 1;

FIG. 3 is a top view of a pick conveyor 14 of the exemplary conveyor system of FIG. 1;

FIG. 5 is a schematic diagram of a vision and control subsystem 30 for use in the exemplary system 10 of FIG. 1.

Referring now to FIGS. 1-3 and 5, the exemplary conveyor system 10 (or system 10) generally includes: a pick conveyor 14 configured to receive a bulk flow of parcels, such as from an upstream conveyor 12; a place conveyor 16 positioned downstream of the pick conveyor 14; a first robot singulator 20 (or first robot 20) and a second robot singulator (or second robot 22) which work in parallel to successively transfer parcels from the pick conveyor 14 into a singulated stream on the place conveyor 16; and a vision and control subsystem 30 that is operably connected to the pick conveyor 14, the first robot 20, and the second robot 22, such that the vision and control subsystem 30 can communicate instructions to control operation of such components.

It is important to recognize that, in the discussion that follows and in the claims of the present application, the term "parcel" is not intended to be limiting and can include any article, item, or object that may be transported, loaded, and/or unloaded in the manner specified within the present disclosure.

Figure 4:
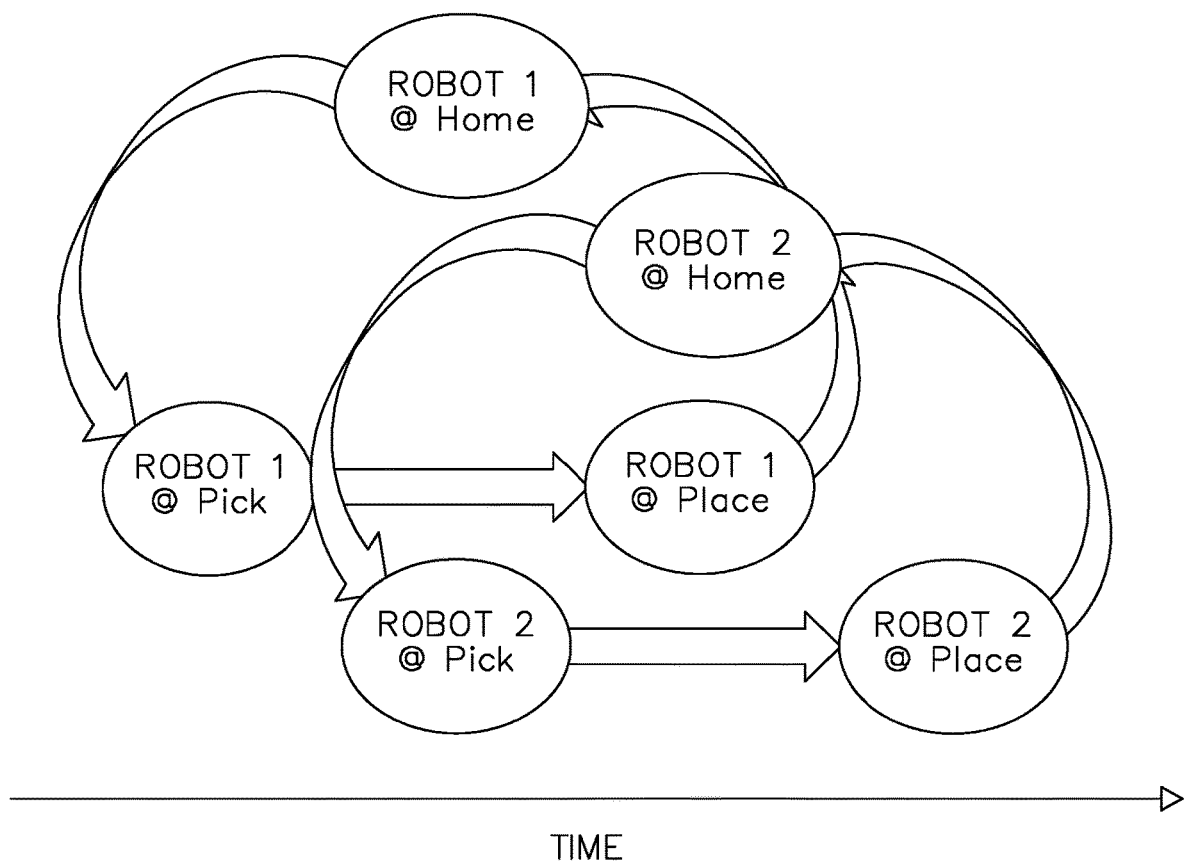
FIG. 4 is a diagram illustrating movement cycles performed by a first robot singulator and a second robot singulator of the exemplary conveyor system of FIG. 1 to transfer parcels from the pick conveyor to a place conveyor in the exemplary conveyor system of FIG. 1.

It is also important to recognize that, in the discussion that follows and in the claims of the present application, the term "pick conveyor" is not intended to be limiting and can include any form of chute, conveyor, or conveying surface, whether static or moving, that defines a "picking area" where parcels can be acquired and transferred to the place conveyor. FIG. 4 is a diagram illustrating movement cycles performed by the first robot 20 and the second robot 22 to transfer parcels from the pick conveyor 14 to the place conveyor 16 of the system 10.

Referring now to FIGS. 1-5, the vision and control subsystem 30 includes a first (or target) camera 34 which can be selectively activated to acquire one or more images of a predetermined region of interest (i.e., the picking area) of the pick conveyor 14 and any parcels located therein (e.g., parcels 50a, 50b, and 50c in FIG. 3). In this exemplary embodiment, the target camera 34 is positioned so that that the field of view of the target camera 34 includes the picking area 15 as well as at least a portion of the pick conveyor 14 located upstream of the picking area 15. The picking area 15 of the pick conveyor 14, in this exemplary embodiment, is defined by, and thus can be characterized as including, two separate areas: a first area 15a and a second area 15b, as shown in FIGS. 1 and 3. Each image acquired by the target camera 34 is processed within the vision and control subsystem 30 to determine the location of parcels positioned within the picking area 15, if any. In some embodiments, the proximity of multiple parcels located within the picking area 15 at a given time relative to each other and/or the distance of parcels located upstream of the picking area 15 may also be assessed using an image acquired by the target camera 34, as further described below. Based on the determined location of the parcels within the picking area 15, the vision and control subsystem 30 communicates instructions to either the first robot 20 or the second robot 22 to successively transfer the parcels within the picking area 15 to the place conveyor 16. Unlike conveyor systems of known construction which employ a single robot singulator, in the system 10 of the present invention, it is not necessary for one parcel to be fully transferred from the picking area 15 to the place conveyor 16 before the transfer process of another parcel within the picking area 15 is commenced. Rather, by utilizing two robots 20, 22, one parcel in the picking area 15 can be engaged for transfer by one robot (e.g., the second robot 22 in FIG. 2) while the other robot (e.g., the first robot 20 in FIG. 2) is transferring another parcel to the place conveyor 16 or returning from such transfer, as shown in FIGS. 2 and 4. The parcel throughput rate (i.e., the rate at which parcels are transferred to the place conveyor 16 in a singulated stream) is thus improved relative to that of conveyor systems of known construction employing only a single robot singulator simply by virtue of utilizing multiple robot singulators 20, 22. As described in greater detail below, to further improve parcel throughput rate, the vision and control subsystem 30 also utilizes the determined location of the parcels within the picking area 15 and the proximity of the parcels to each other to selectively activate the target camera 34, the first and second robots 20, 22, and, in certain embodiments, the pick conveyor 14 in a manner which reduces downtime associated with image acquisition and processing, parcel transfer to the place conveyor 16 (i.e., parcel singulation), and parcel delivery to the picking area 15, respectively.

Referring now to FIGS. 1, 2 and 5, in this exemplary embodiment the vision and control subsystem 30 further includes a second (or confirm) camera 36, which can be selectively activated to acquire one or more images of a place area 17 of the place conveyor 16 and any parcels located therein. The place area 17 of the place conveyor 16 corresponds to the area of the place conveyor 16 in which parcels transferred by the first robot 20 and the second robot 22 are delivered. Each image acquired by the confirm camera 36 is processed within the vision and control subsystem 30 to confirm transfer of a parcel to the place conveyor 16, as further described below with reference to FIG. 8.

Referring again to FIGS. 1 and 2, in this exemplary embodiment, the system 10 includes an upstream conveyor 12 that includes multiple conveyors, each configured to receive and convey a bulk flow of parcels downstream toward the pick conveyor 14. Specifically, in this exemplary embodiment, the upstream conveyor 12 includes a feed conveyor 12a that initially receives a bulk flow of parcels and a destacking conveyor 12b, such as that described in commonly assigned U.S. patent application Ser. No. 17/092,660 (now U.S. Pat. No. 11,203,493), which is incorporated herein by reference. The destacking conveyor 12b is positioned to receive parcels offloaded from the feed conveyor 12a and is oriented at a predetermined angle to separate parcels which are vertically stacked prior to being offloaded onto the pick conveyor 14, as perhaps best shown in FIG. 2. In some embodiments, the feed conveyor 12a may act as a damming conveyor, such as that also described in U.S. patent application Ser. No. 17/092,660 (now U.S. Pat. No. 11,203,493), which can be selectively activated and deactivated (or "indexed") to regulate the offloading of parcels to the destacking conveyor 12b. As shown best in FIG. 2, in this exemplary embodiment a proximal end of the pick conveyor 14 is positioned below a distal end of the destacking conveyor 12b so that parcels offloaded from the distal end of the destacking conveyor 12b fall a predetermined distance onto the pick conveyor 14 to further promote separation of parcels stacked on top of each other.

Referring now to FIGS. 1, 2, and 5, in this exemplary embodiment, both the first robot 20 and the second robot 22 are in the form of a robotic arm. More specifically, in this exemplary embodiment, the first robot 20 and the second robot 22 are each a six-axis articulating robotic arm. One suitable robot which can be used as the first robot 20 and the second robot 22 is the M-10iD/12 robot manufactured by and available from FANUC America of Rochester Hills, Michigan. The first robot 20 and the second robot 22 each include an end effector 20a, 22a that is configured to engage and maintain a parcel in association with the robot 20, 22 to which the end effector 20a, 22a corresponds during transfer from the pick conveyor 14 to the place conveyor 16. For example the end effector 20a, 22a of the first robot 20 and the second robot 22 may include on or more vacuum cups in fluid communication with a vacuum source and configured to be engaged with a parcel. In this regard, suitable end effectors which may be utilized as the end effector 20a, 22a of the first robot 20 and the second robot 22 include, but are not limited to, those described in U.S. Patent Application Publication No. 2020/0262069, which is incorporated herein by reference.

Referring now to FIGS. 1, 2, 4, and 5, to transfer parcels from the picking area 15 of the pick conveyor 14 to the place area 17 of the place conveyor 16, the first robot 20 and the second robot 22 are positioned in close proximity to the picking area 15. In this regard, and in this exemplary embodiment, the first robot 20 and the second robot 22 are each mounted to a framework 25 for supporting the first robot 20 and the second robot 22 in an inverted (or hung) orientation over the picking area 15. Of course, the first robot 20 and the second robot 22 may be alternatively positioned or mounted without departing from the spirit or scope of the present invention, as evidenced, for example, by conveyor systems 300, 500, 600, 700, and 800 described below with reference to FIGS. 11 and 13-16. As shown in FIG. 4, in transferring parcels from the picking area 15 to the place area 17, the first robot 20 and the second robot 22 each follow the same general movement cycle, which, in this case, includes three movements: a first movement from a predetermined initial (or "home") position to a target parcel within the picking area 15 to initiate transfer of the target parcel; a second movement from the point of engagement with the target parcel to a position above the place area 17 of the place conveyor 16 to deliver the target parcel; and a third movement from the position above the place area 17 of the place conveyor 16 back to the home position. In this exemplary embodiment, when in the "home" position, the first robot 20 is centrally positioned relative to the first area 15a of the picking area 15 and the second robot 22 is centrally positioned relative to the second area 15b of the picking area 15.

Referring now again to FIGS. 1, 2, and 5, in this exemplary embodiment, the vision and control subsystem 30 generally includes a first vision unit 31, a second vision unit 35, and a controller 40. The first vision unit 31 and the second vision unit 35 are operably connected to the controller 40, such that the controller 40 can communicate instructions to, and receive data from, the first vision unit 31 and the second vision unit 35. The first vision unit 31 includes the target camera 34, which is positioned so that the picking area 15 is within the field of view of the target camera 34 and is configured to acquire two-dimensional and/or three-dimensional images of the picking area 15. In this exemplary embodiment, although not visible in FIG. 2 the target camera 34 is mounted to the framework 25 and positioned directly above the picking area 15. The second vision unit 35 includes the confirm camera 36, which is positioned so that the place area 17 of the place conveyor 16 is within the field of view of the confirm camera 36 and is configured to acquire two-dimensional and/or three-dimensional images of the place conveyor 16. In this exemplary embodiment, the confirm camera 36 is positioned above the place conveyor 16 and also mounted to the framework 25. One of skill in the art will readily appreciate that the target camera 34 and/or the confirm camera 36 may be alternatively mounted or positioned without departing from the spirit or scope of the present invention. Suitable cameras for use in the first vision unit 31 and the second vision unit 35 include three-dimensional image sensors manufactured and distributed by ifm Effector Inc. of Malvern, Pennsylvania.

Referring now specifically to FIG. 5, in this exemplary embodiment, images of the picking area 15 acquired by the target camera 34 are processed locally at the first vision unit 31. To this end, the first vision unit 31 further includes a processor 32 configured to execute instructions (routines) stored in a memory component 33 or other computer-readable medium to process images acquired by the target camera 34. Although the target camera 34 is generally referred to herein and illustrated within the drawings as including only a single camera, embodiments are contemplated in which the target camera 34 comprises multiple cameras. Of course, the processor 32 of the first vision unit 31 may also comprise multiple processors. For instance, in some embodiments, each respective camera of the first vision unit 31 may have a processor associated therewith to process the images acquired by the camera. Similarly, in this exemplary embodiment, the images of the place conveyor 16 acquired by the confirm camera 36 are processed locally at the second vision unit 35. To this end, the second vision unit 35 further includes a processor 37 configured to execute instructions (routines) stored in a memory component 38 or other computer-readable medium to process the images acquired by the confirm camera 36. Although the confirm camera 36 is generally referred to herein and illustrated within the drawings as including only a single camera, embodiments are contemplated in which the confirm camera 36 comprises multiple cameras. Of course, the processor 37 of the second vision unit 35 may also comprise multiple processors. For instance, in some embodiments, each respective camera of the second vision unit 35 may have a processor associated therewith to process the images acquired by the camera. Suitable processors for use in the first vision unit 31 and the second vision unit 35 include that provided within the Jetson Nano computer manufactured and distributed by Nvidia Corporation of Santa Clara, California, although other processors suitable of performing the operations described herein may alternatively be used.

Although it is generally preferred that the target camera 34 and the confirm camera 36 are each provided with their own processors 32, 37, one of skill in the art will appreciate that, in alternative embodiments, a single processor may be used to carry out the respective operations for the processor 32 of the first vision unit 31 and the processor 37 of the second vision unit 35 described herein. In this regard, in some embodiments, system 10 may include only a single vision unit in which both the target camera 34 and the confirm camera 36 are components.

Referring still to FIG. 5, the controller 40 includes a processor 42 configured to execute instructions stored in a memory component 43 or other computer-readable medium. In this exemplary embodiment, the controller 40 is a programmable logic controller or other industrial controller. The controller 40 is connected to the first vision unit 31 and the second vision unit 35 to facilitate the transmission of data from the first vision unit 31 and the second vision unit 35 to the controller 40 and the communication of instructions from the controller 40 to the first vision unit 31 and the second vision unit 35, either by wired connection (e.g., Ethernet connection) or by wireless connection (e.g., via a network) using known interfaces and protocols.

Although it is generally preferred that the controller 40, the first vision unit 31, and the second vision unit 35 are each provided with their own processors 32, 37, 42, in alternative embodiments, a single processor may be used to carry out the respective operations described for the processor 32 of the first vision unit 31, the processor 37 of the second vision unit 35, and the processor 42 of the controller 40. In this regard, in some embodiments, the first vision unit 31 and the second vision unit 35 may be components of the controller 40 or be characterized as including only the target camera 34 and the confirm camera 36, respectively.

Referring now to FIG. 5, in some embodiments, the system 10 may also include a rejection mechanism 60 that is positioned and configured to push parcels across the surface of the pick conveyor 14. For example, the rejection mechanism may be mounted to the pick conveyor 14, such that, when activated, the rejection mechanism moves across the picking area 15 to push parcels determined by the vision and control subsystem 30 to be "unconveyable" (e.g., parcels which exceed certain predetermined dimensions or that are of a certain shape) off of the pick conveyor 14. As such, and as shown in FIG. 5, the rejection mechanism 60 would be operably connected to the controller 40, such that the rejection mechanism can be selectively activated in response to instructions (or signals) communicated from the controller 40. Furthermore, in some instances, the controller 40 may communicate instructions which cause the rejection mechanism 60 to slightly move (or "bump") one or more parcels located in the picking area 15 to reposition such parcels. In other instances, the controller 40 may communicate instructions which cause the rejection mechanism 60 to move entirely across (or "fully sweep") the picking area 15 to push one or more parcels located in the picking area 15 completely off of the pick conveyor 14. In some implementations, whether the rejection mechanism 60 is selectively activated, generally, or activated as to bump or fully sweep parcels may be based on the controller 40 of the vision and control subsystem 30 determining one or more parcels located in the picking area 15 do not satisfy one or more predetermined criteria (e.g., parcel weight or size criteria). Suitable rejection mechanisms which may be utilized within the system 10 include those described in U.S. Patent Application Publication No. 2020/0377309 (now U.S. Pat. No. 11,014,767), which is incorporated herein by reference.

Referring again to FIGS. 1-3 and 5, in this exemplary embodiment, the system 10 further includes a sensor 62, such as a photoelectric sensor, positioned a predetermined distance from a distal end of the pick conveyor 14. The sensor 62 is configured to detect the presence of parcels within the picking area 15 (as indicated by the dashed lines in FIG. 10) and obtain readings regarding the same. As shown in FIG. 5, the sensor 62 is operably connected to the controller 40 of the vision and control subsystem 30, such that readings obtained by the sensor 62 are transmitted to the controller 40 for subsequent processing. The sensor 62 may be selectively activated to obtain readings in response to instructions (or signals) communicated from the controller 40 or obtain readings substantially continuously. As described in further detail below, in some embodiments, the readings obtained by the sensor 62 are processed by the controller 40 to during a pick and index subroutine to identify when the indexing of the pick conveyor 14 should be stopped, as further described below with reference to FIGS. 7 and 10.

Figure 6:
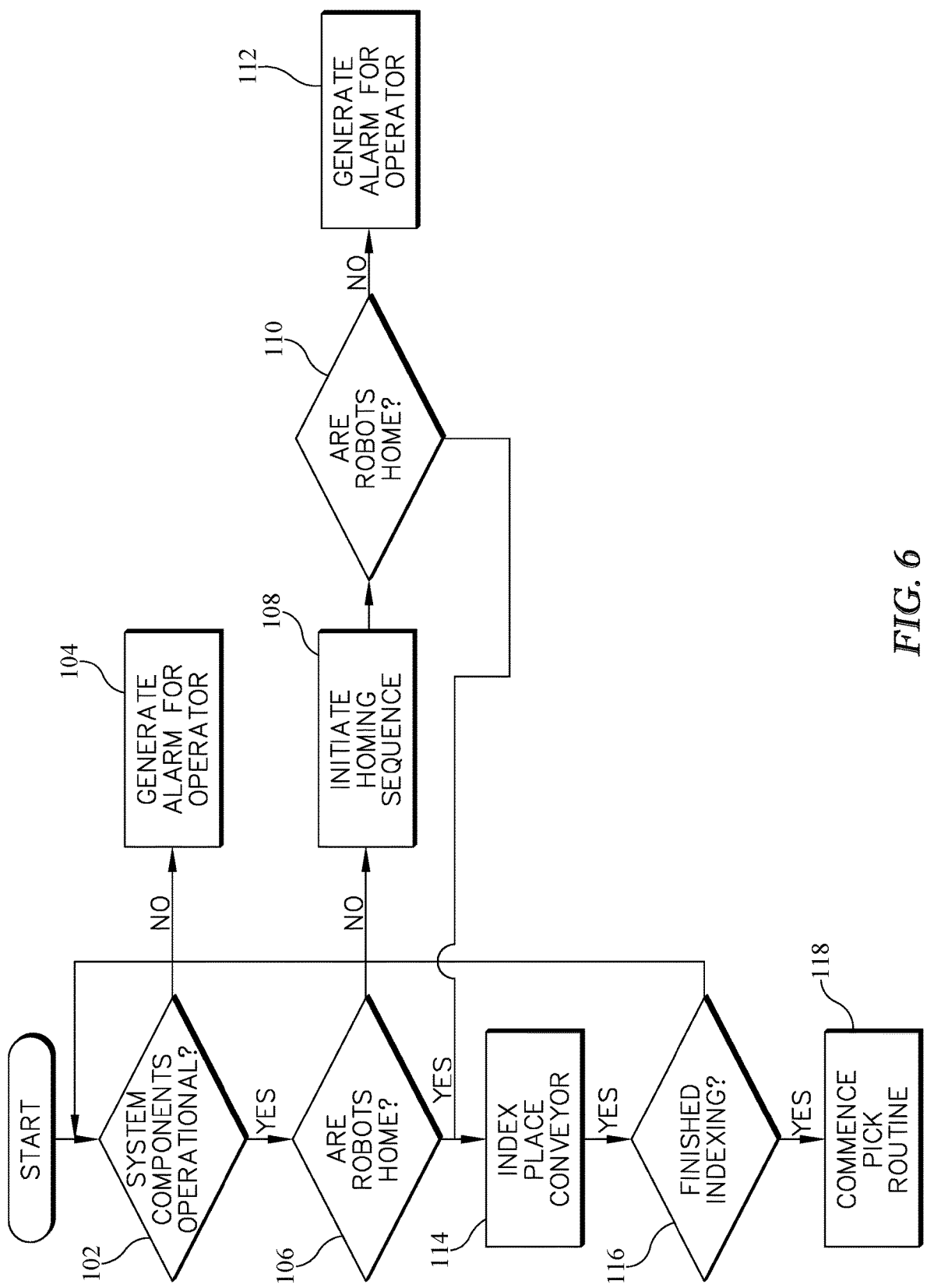
FIG. 6 is a flow chart of an exemplary routine for initializing the exemplary conveyor system of FIG. 1 for parcel transfer.

FIG. 6 is a flow chart of an exemplary routine for initializing the exemplary conveyor system 10 for parcel transfer.

It should be appreciated that, the routines and subroutines described herein correspond to a set of instructions that are stored in the memory component 43 and can be executed by the processor 42 of the controller 40, unless otherwise specified.

Referring now to FIGS. 5 and 6, to ensure respective components of the system 10 are operational and/or positioned to facilitate the parcel transfer operations described herein, in this exemplary embodiment, a system initiation routine is first executed by the vision and control subsystem 30 prior to the first robot 20 and the second robot 22 transferring any parcels from the pick conveyor 14 to the place conveyor 16. As indicated by decision 102 in FIG. 6, in this exemplary embodiment, the system initiation routine commences with the vision and control subsystem 30 determining whether each of the feed conveyor 12a, the destacking conveyor 12b, the pick conveyor 14 (in certain embodiments), the place conveyor 16, the first robot 20, the second robot 22, the target camera 34, and the confirm camera 36 (if in use) are operational. In this regard, the processor 42 of the controller 40 may execute instructions which cause the controller 40 to determine whether the foregoing components are activated (e.g., as indicated by whether the controller 40 is receiving feedback (or signals) from the respective components generally) and/or satisfy one or more predetermined criteria (e.g., as indicated by the nature of the feedback (or signals) received from such components). In some embodiments, the vision and control subsystem 30 may also determine whether the rejection mechanism 60 and/or sensor 62 are operational as part of decision 102. In the event a component checked by the vision and control subsystem 30 is determined to be nonoperational, in this exemplary embodiment, the controller 40 will generate an alarm to notify an operator of such component's dysfunction, as indicated by block 104 in FIG. 6. In some embodiments, the alarm generated by the controller 40 may be in the form of a visual cue displayed on a display (not shown) that is operably connected to the controller 40 and/or an audible cue projected from a speaker (not shown) that is operably connected to the controller 40.

Referring now to FIGS. 4-6, after the first robot 20 and the second robot 22 are determined to be operational, the vision and control subsystem 30 assesses whether the first robot 20 and the second robot 22 are each in the home position, as indicated by decision 106 in FIG. 6. For each robot determined not to be in the home position, the controller 40 will communicate instructions (or signals) which cause that robot to perform a homing sequence which returns the robot to its home position, as indicated by block 108. Once the homing sequence for each robot initially determined not to be in the home position is completed, the vision and control subsystem 30 then reassesses the positioning of the first robot 20 and the second robot 22 to determine if both are in the home position, as indicated by decision 110 in FIG. 6. In this regard, and in some embodiments, the controller 40 may process information (e.g., coordinate data) received from the first robot 20 and the second robot 22 to determine the positioning of the first robot 20 and the second robot 22. In this implementation, if, after completion of the homing sequence, either robot is again determined not to be in the home position, the controller 40 will generate an alarm to notify an operator that the first robot 20 and/or the second robot 22 are not correctly positioned, as indicated by block 112 in FIG. 6.

Referring now to FIGS. 5-6, if, after completion of the homing sequence, both the first robot 20 and the second robot 22 are both determined to be in the home position, the controller 40 communicates instructions (or signals) which cause the place conveyor 16 to be indexed a predetermined distance, as indicated by block 114 in FIG. 6. In doing so, any parcels located on the place conveyor 16 are thus moved further downstream, thereby providing additional room in the place area 17 where parcels transferred from the picking area 15 by the first robot 20 or the second robot 22 can be delivered. As indicated by block 116 in FIG. 6, in this implementation, the controller 40 determines whether the place conveyor 16 has finished indexing (e.g., based on signals or other information received from the place conveyor 16, the passage of a predetermined duration of time, etc.) prior to the first robot 20 or the second robot 22 transferring any parcels from the picking area 15. In this exemplary embodiment, once the controller 40 determines that the place conveyor 16 has finished indexing, a pick (or parcel transfer) routine is executed by the system 10, as indicated by block 118 in FIG. 6 and as further described below.

Figure 7:
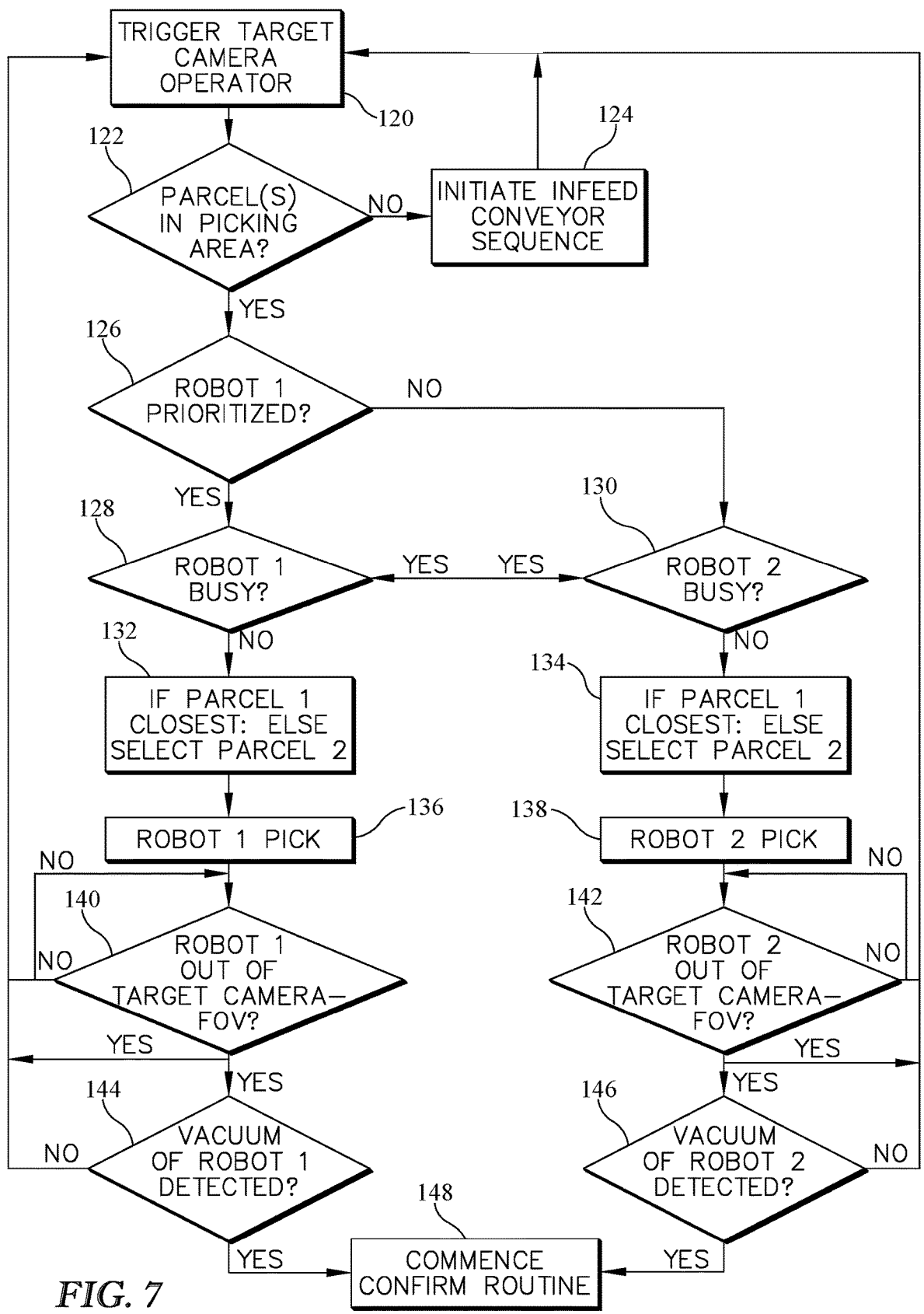
FIG. 7 is a flow chart of an exemplary routine for engaging and transferring parcels in the exemplary conveyor system of FIG. 1.

FIG. 7 is a flow chart of an exemplary routine for engaging and transferring parcels in the exemplary conveyor system 10.

Referring now to FIGS. 1-3, 5, and 7, in this exemplary implementation, to commence transferring parcels from the pick conveyor 14 to the place conveyor 16, the target camera 34 is selectively activated in response to instructions (or signals) communicated from the controller 40 to acquire an image of the picking area 15 within the field of view of the target camera 34 and any parcels located thereon, such as parcels 50a, 50b, 50c in FIG. 3, as indicated by block 120 in FIG. 7. The image is then, in this exemplary embodiment, processed by the processor 32 of the first vision unit 31. The first vision unit 31 then transmits image data to the controller 40. Based on the image data received from the first vision unit 31, the controller 40 determines whether any parcels are located in the picking area 15, as indicated by decision 122 in FIG. 7. In this exemplary embodiment, if no parcels are detected within the picking area 15, the controller 40 communicates instructions which cause the upstream conveyor 12, which, again, in this case, is defined by the feed conveyor 12a and the destacking conveyor 12b, and the pick conveyor 14 to be indexed a predetermined distance to move parcels located downstream towards the picking area 15 of the pick conveyor 14, as indicated by block 124 in FIG. 7. Once the upstream conveyor 12 and the pick conveyor 14 have been indexed a predetermined distance, the target camera 34 acquires another image of the to determine whether any parcels are located within the picking area 15. The foregoing process is repeated until the target camera 34 acquires an image indicating that one or more parcels are located in the picking area 15.

Referring still to FIGS. 1, 2, 5, and 7, once the vision and control subsystem 30 determines that one or more parcels are located within the picking area 15 of the pick conveyor 14, the controller 40 communicates instructions which cause the first robot 20 and the second robot 22 to successively transfer parcels located within the picking area 15 of the pick conveyor 14 to the place conveyor 16. To reduce downtime associated with parcel transfer from the picking area 15 to the place conveyor 16 and thus improve parcel throughput rate, in this exemplary embodiment, the controller 40 selectively communicates parcel transfer instructions to the first robot 20 and the second robot 22 by following a robot selection subroutine, as indicated by decisions 126, 128, 130 and blocks 132, 134 in FIG. 7. When executed, the robot selection subroutine causes the controller 40 to determine which robot of the first robot 20 and the second robot 22 should be selected for parcel transfer and which parcel within the picking area 15 should be transferred by the selected robot in instances where multiple parcels are located in the picking area 15 at a given time. In this exemplary embodiment, the selections resulting from execution of the robot selection subroutine are based on a priority queue, the availability of each robot, and and/or the proximity of the parcels to a selected robot, as further described below.

Referring still to FIGS. 1, 2, 5, and 7, the robot selection subroutine commences with the controller 40 determining whether the first robot 20 or the second robot 22 has priority to engage and transfer a parcel from the picking area 15, as indicated by decision 126 in FIG. 7. In this exemplary embodiment, whether the first robot 20 or the second robot 22 has priority to engage and transfer a parcel at a given time is dictated by a priority queue, which, at a given time, contains one or more entries corresponding to the order in which the first robot 20 and/or the second robot 22 will be given initial priority to engage and transfer parcels from the pick conveyor 14. To reduce processing times, in this exemplary embodiment, at least the initial entry of the priority queue is predetermined and corresponds to which robot will be the first to engage and transfer a parcel within the picking area 15. Subsequent entries of the priority queue may be predetermined or populated and assigned by the controller 40 during the parcel transfer process.

Referring now to FIGS. 1, 2, 4, 5, and 7, once priority is determined, the controller 40 subsequently determines whether the robot with priority is actually available to transfer a parcel to the place conveyor 16, as indicated by decisions 128, 130 in FIG. 7. If the robot with priority is available, the controller 40 will select that robot to effectuate transfer of a parcel from the picking area 15 to the place conveyor 16. However, in the event the robot with priority is busy or otherwise unavailable to transfer a parcel to the place conveyor 16, the controller 40 will assess whether the robot without priority is available to transfer the parcel and instead select that robot to effectuate transfer of the parcel, provided the robot without priority is not also busy or otherwise unavailable. For instance, using FIG. 2 as an example, if the first robot 20 has priority, but is returning from transferring a first parcel 50a to the place conveyor 16, and the second robot 22 is in the home position, then the controller 40 will select the second robot 22 to effectuate transfer of a selected parcel (in this case, parcel 50b) in the picking area 15 to the place conveyor 16. By determining and selecting the first available robot to effectuate transfer of a parcel, the robot selection subroutine thus effectively reduces or eliminates instances in which a selected parcel is delayed transfer due to the unavailability of a robot singulator, and, in this way, reduces or eliminates downtime associated with transferring parcels from the picking area 15 of the pick conveyor 14 to the place area 17 of the place conveyor 16.

Referring now to FIGS. 1-3, 5, and 7, after the first robot 20 or the second robot 22 is selected by the controller 40, the controller 40 determines which parcel in the picking area 15 of the pick conveyor 14 will be transferred to the place conveyor 16 by the selected robot. In instances where the image data received from the first vision unit 31 indicates that only a single parcel is located within the picking area 15, the controller 40 will communicate instructions to the selected robot to engage and transfer that parcel to the place conveyor 16. However, in instances where the image data received by the controller 40 from the first vision unit 31 indicates multiple parcels are located within the picking area 15 (e.g., as shown in FIG. 3), the controller 40 will, in this exemplary embodiment, select one of the parcels to be transferred to the place conveyor 16 based on parcel proximity to the selected robot. Specifically, in this exemplary embodiment, the controller 40 is configured to select the parcel closest to the selected robot for transfer, as indicated by blocks 132, 134 in FIG. 7. In this exemplary embodiment, the location data associated with each respective parcel corresponds to the coordinates (e.g., x-coordinate values and y-coordinate values) of the parcel within the picking area 15. In some embodiments, the location data may further include an indication as to whether each respective parcel is located within the first area 15a or the second area 15b of the picking area 15. In such embodiments, the controller 40 may thus determine which parcel is closest to the selected robot based on coordinates of each respective parcel, which area of the picking area 15 the parcels are located, or a combination thereof.

Referring now to FIGS. 3, 5, and 7, in embodiments, the location data of each respective parcel within the picking area 15 may be initially generated by the first vision unit 31 while processing the image acquired by the target camera 34 and subsequently transmitted to the controller 40. The coordinates of the parcel determined to be closest to the selected robot are included in instructions communicated from the controller 40 to the selected robot, which cause the selected robot to engage and transfer the selected parcel to the place conveyor 16, as indicated by blocks 136, 138 in FIG. 7. As perhaps best indicated by bounding boxes 13a and 13b surrounding parcels 50a and 50b, respectively, in FIG. 3, in this exemplary embodiment, the first vision unit 31 is configured to identify and generate location data for only two parcels located within the picking area 15 at a time. It is appreciated, however, that, in alternative embodiments, the first vision unit 31 may be configured to identify and generate location data for more than two parcels located within the picking area 15 without departing from the spirit or scope of the present invention.

Referring now to FIGS. 5 and 7, once the controller 40 has communicated instructions to the selected robot to engage and transfer the selected parcel, the vision and control subsystem 30 verifies whether the selected parcel was successfully engaged and transferred out of the picking area 15 by the selected robot. To this end, in this exemplary embodiment, the controller 40 determines whether both the selected parcel and the selected robot are out of the field of view of the target camera 34, as indicated by decisions 140, 142 in FIG. 7. In this regard, the controller 40 communicates instructions which causes the first vision unit 31 to assess whether both the selected robot and the selected parcel are out of the field of view of the target camera 34 and communicate the results of such assessment to the controller 40. To initiate this process, in some embodiments, the controller 40 may communicate instructions which cause the target camera 34 to acquire another image of the picking area 15. In such embodiments, the processor 32 of the first vision unit 31 then processes the image and transmits image data to the controller 40 which indicates whether the selected robot and selected parcel are out of the field of view of the target camera 34, thus indicating the selected parcel was successfully engaged and transferred out of the picking area 15. If the controller 40 determines that the selected robot or the selected parcel are not out of the field of view of the target camera 34, the foregoing process may be repeated after a predetermined period of time to provide the selected robot with additional time to transfer the selected parcel. In this exemplary embodiment, if the selected robot or the selected parcel is not out of the field of view of the target camera 34 after a predetermined period of time or after a predetermined number of iterations of acquiring and processing additional images of the picking area 15, then the controller 40 will communicate instructions to restart the parcel transfer routine (the start of which being indicated by block 120 in FIG. 7). Conversely, if the controller 40 determines that the selected robot and the selected parcel are out of the field of view of the target camera 34, in this exemplary embodiment, the controller 40 will proceed with an additional verification step (as indicated by decisions 144, 146 in FIG. 7) as well as communicate instructions to restart the parcel transfer routine to initiate the transfer and singulation of additional parcels.

Referring now to FIGS. 2, 5, and 7, in this exemplary embodiment, to further verify successful engagement of the selected robot with the selected parcel, the controller 40 also determines whether the selected robot is pneumatically engaged with the selected parcel, as indicated by decisions 144, 146 in FIG. 7. Accordingly, in some embodiments, the end effector 20a of the first robot 20 and the end effector 22a of the second robot 22 each include a vacuum sensor (not shown). The vacuum sensor of each robot is operably connected to the controller 40, such that the vacuum sensor provides vacuum pressure feedback to the controller 40, which the controller 40, in turn, utilizes to determine whether the end effector of the selected robot is pneumatically engaged with the selected parcel. If the controller 40 determines that the end effector of the selected robot is not pneumatically engaged with the selected parcel, then the controller 40 will communicate instructions which cause the above-described parcel transfer routine to be repeated. Otherwise, the system 10 will proceed to verify whether the selected parcel was successfully transferred and delivered to the place conveyor 16 by executing a confirmation (or parcel placement) routine, as indicated by block 148 in FIG. 7 and further described below.

Figure 8:
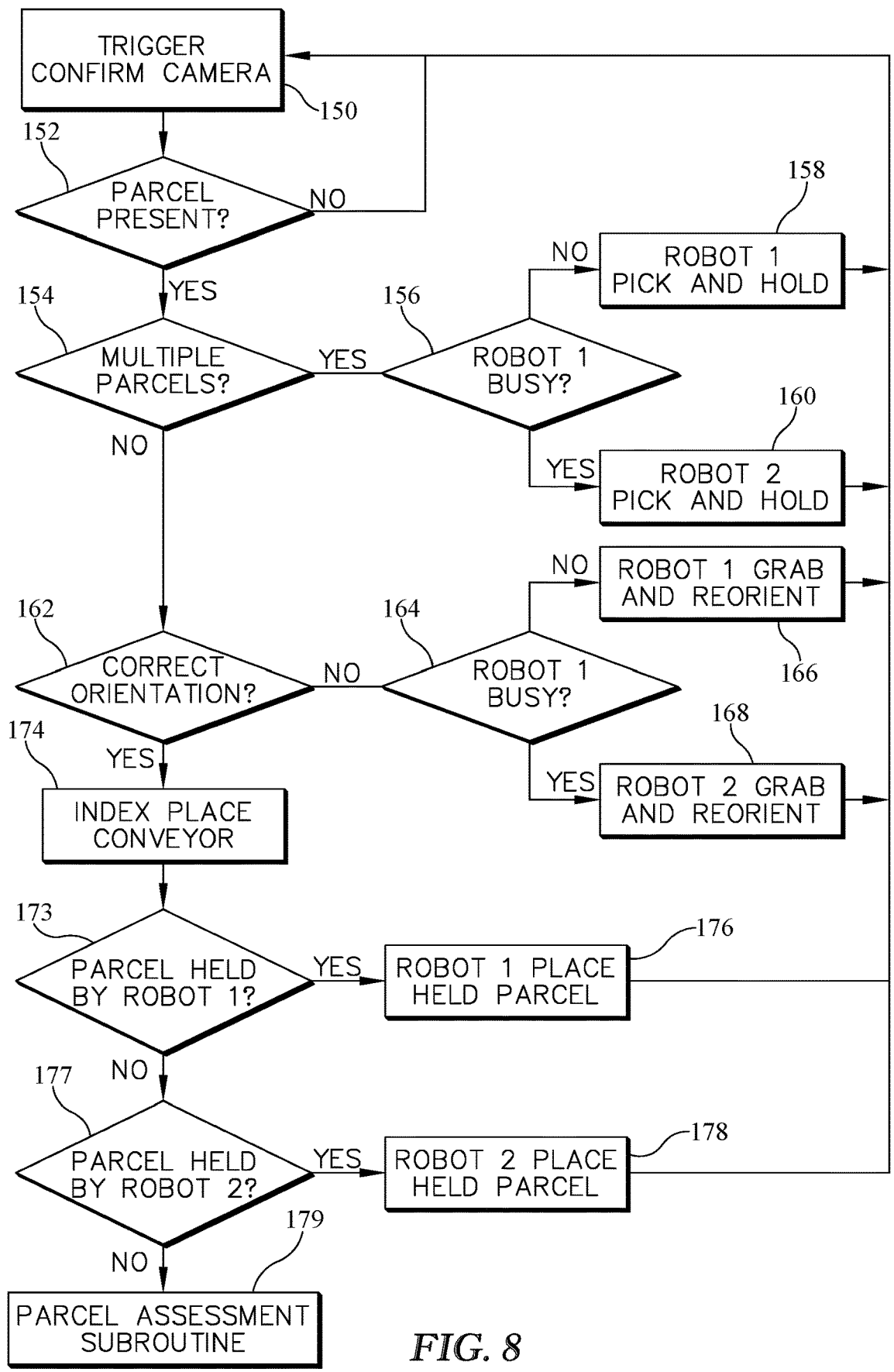
FIG. 8 is a flow chart of an exemplary routine for confirming parcel transfer in the exemplary conveyor system of FIG. 1.

Referring now to FIGS. 1, 2, 5, and 8, to commence verifying placement of the select parcel on the place conveyor 16, the confirm camera 36 is selectively activated in response to instructions (or signals) communicated from the controller 40 to acquire an image of the place area 17 of the place conveyor 16, as indicated by block 150 in FIG. 8. The image of the place area 17 is then processed by the processor 37 of the second vision unit 35. The second vision unit 35 then transmits image data to the controller 40. Based on the image data received from the second vision unit 35, the controller 40 initially determines whether the selected parcel was delivered to the place conveyor 16, as indicated by decision 152 in FIG. 8. If the controller 40 determines that the selected parcel has not been delivered to the place conveyor 16, the controller 40 communicates instructions (or signals) which cause the confirm camera 36 to acquire another image of the place area 17 and effectively restart the confirmation routine. Otherwise, the system 10 proceeds with the next step of confirmation routine.

Referring still to FIGS. 1, 2, 5, and 8, in this exemplary embodiment, prior to indexing the place conveyor 16 to provide room for subsequent parcels to be delivered, the system 10 executes a singulation confirmation subroutine to confirm the parcel is properly singulated, as indicated by decisions 154, 156, 162, 164 and blocks 158, 160, 166, 168 in FIG. 8. As indicated by decision 154 in FIG. 8, in this exemplary embodiment, the singulation confirmation subroutine includes the controller 40 determining whether multiple parcels were inadvertently simultaneously transferred from the pick conveyor 14 to the place conveyor 16 by the selected robot based on the image data received from the second vision unit 35. If the controller 40 determines multiple parcels were transferred, then the controller 40 subsequently determines whether the first robot 20 or the second robot 22 is available, as indicated by decision 156 in FIG. 8. Again, the availability of each robot may be determined based on whether the robot is in the home position. Based on the determined availability of the first robot 20 and the second robot 22, the controller 40 then communicates instructions which cause either the first robot 20 or the second robot 22 to engage and hold one of the parcels previously detected within the place area 17, as indicated by blocks 158, 160 in FIG. 8. In some embodiments, the parcel engaged may be selected based on its positioning on the place conveyor 16. For example, in some embodiments, the parcel positioned closest to the center of the place area 17 may be engaged and held. After one of the parcels is held, the controller 40 communicates instructions (or signals) which cause the confirm camera 36 to acquire another image of the place area 17 and effectively restart the confirmation routine. The robot remains holding the parcel until after the place conveyor 16 is indexed, at which time, the robot holding the parcel delivers the parcel back into the place area 17 of the place conveyor 16, as indicated by blocks 176, 178 in FIG. 8.

Referring still to FIGS. 1, 2, 5, and 8, in this exemplary embodiment, the singulation confirmation subroutine further includes the controller 40 determining whether a parcel transferred by the first robot 20 or the second robot 22 during the parcel transfer routine is oriented on the place conveyor 16 in a manner which satisfies one or more predetermined criteria (e.g., positioned at a certain angle, positioned upright, etc.) based on the image data received from the second vision unit 35, as indicated by decision 162. If the controller 40 determines that the parcel is not oriented as to satisfy the predetermined criteria, then the controller 40 subsequently determines whether the first robot 20 or the second robot 22 is available, as indicated by decision 164 in FIG. 8. Based on the determined availability of the first robot 20 and the second robot 22, the controller 40 then communicates instructions which cause either the first robot 20 or the second robot 22 to engage and reorient the parcel in a manner which satisfies the predetermined criteria, as indicated by blocks 166, 168 in FIG. 8. Once the parcel is reoriented, the controller 40 communicates instructions which cause the confirm camera 36 to acquire another image of the placing area and effectively restart the confirmation routine to confirm the parcel is properly oriented.

Referring still to FIGS. 1, 2, 5, and 8, after verifying the absence of multiple parcels in the place area 17 and that the parcel within the place area 17 is properly oriented, the controller 40 communicates instructions which cause the place conveyor 16 to be indexed a predetermined distance, as indicated by block 174 in FIG. 8. As a result, any parcels on the place conveyor 16 are moved further downstream to create room in the place area 17 for another parcel to be transferred. As noted above, following indexing of the place conveyor 16, if applicable, the parcel held by the first robot 20 or the second robot 22 is transferred back to the place conveyor 16. Accordingly, in this exemplary embodiment, following indexing of the place conveyor 16, the controller determines whether a parcel is being held by the first robot 20 or the second robot 22, as indicated by decisions 173, 177 in FIG. 8. If the controller 40 does determine a parcel is being held by one of the robots, the controller 40 then communicates instructions which cause the robot holding the parcel to deliver the parcel onto the place conveyor 16, as indicated by blocks 176, 178 in FIG. 8. Following such delivery, the controller 40 communicates instructions which cause the confirm camera 36 to acquire another image of the place area 17 of the place conveyor 16 and effectively restart the confirmation routine to confirm the delivered parcel is properly oriented. If the place conveyor 16 is indexed and no parcel is held by the first robot 20 or the second robot 22, the system 10 will proceed to transfer any remaining parcels in need of transfer to the place conveyor 16 by executing a parcel assessment subroutine, as indicated by block 179 in FIG. 8 and further described below with respect to FIG. 9.

Figure 9:
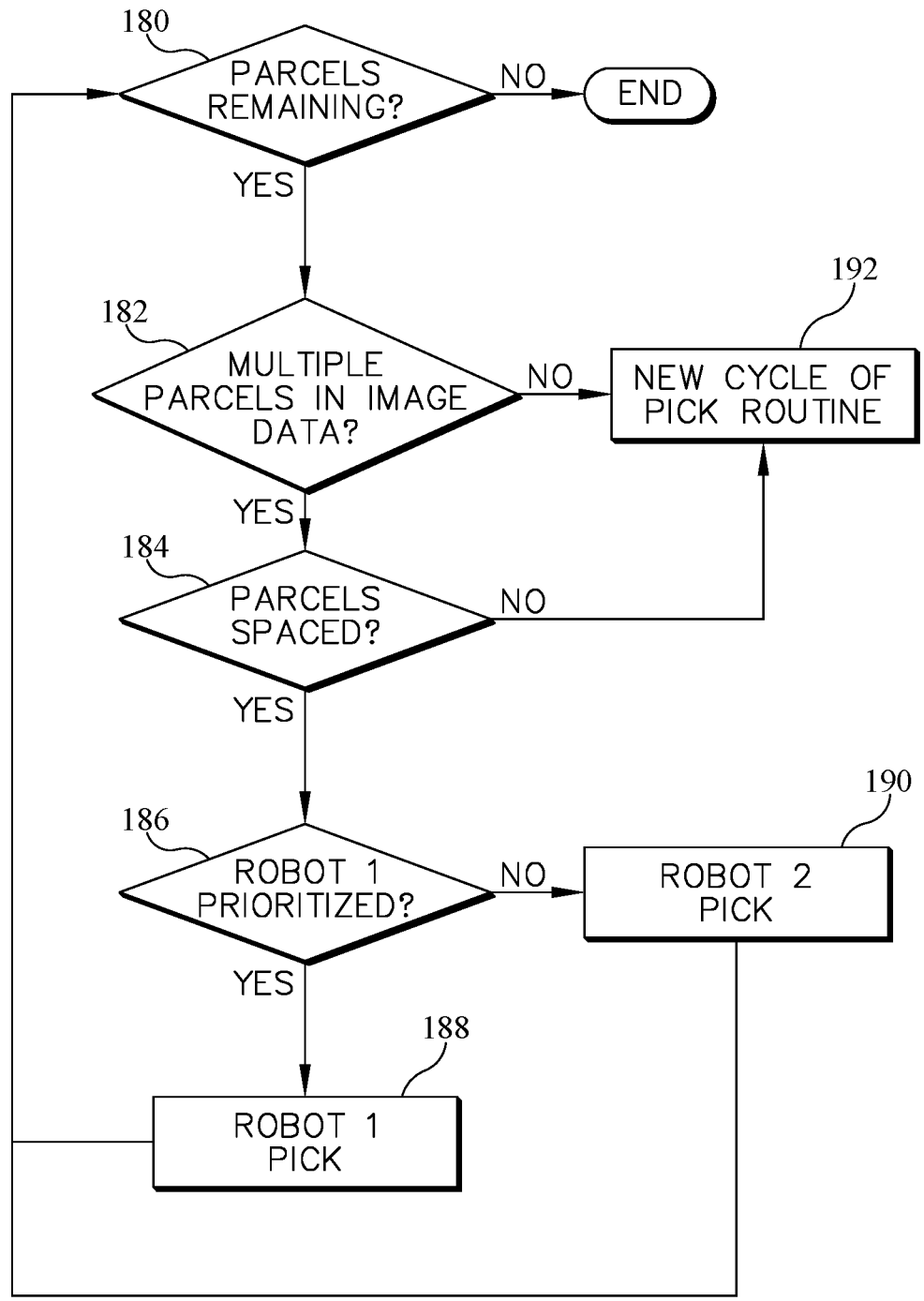
FIG. 9 is an exemplary subroutine for assessing and transferring parcels in the exemplary conveyor system of FIG. 1.

Referring now to FIGS. 7 and 9, the parcel assessment subroutine outlined in FIG. 9 is preferably implemented within and defines a portion of the parcel transfer routine described above with reference to FIG. 7 that occurs following execution of the above-described confirmation routine. As shown in FIG. 9, in this exemplary embodiment, the parcel assessment subroutine commences by the controller 40 determining whether there are any remaining parcels within the system 10 in need of transfer to the place conveyor 16, as indicated by decision 180 in FIG. 9. To this end, the processor 42 of the controller 40 assesses whether the latest image data received from the first vision unit 31 indicates the presence of more than one parcel within the picking area 15, as indicated by decision 182 in FIG. 9. If the controller 40 determines that the latest image data received from the first vision unit 31 does not indicate the presence of more than one parcel, the controller 40 will communicate instructions which cause a new cycle of the above-described parcel transfer routine (the start of which being indicated by block 120 in FIG. 7), as indicated by block 192 in FIG. 9. In some embodiments, if no parcels are detected within the picking area 15 of the pick conveyor 14 within a predetermined period of time and/or after a predetermined number of upstream conveyor 12 and pick conveyor 14 indexes, the controller 40 may determine that no parcels are remaining during decision 180 and communicate instructions which cease operation of the system 10.

Conversely, and referring now to FIGS. 1-3, 5, and 9, if the controller 40 determines that the latest image data received from the first vision unit 31 indicates the presence of multiple parcels, then the controller 40 will process the image data to determine whether the parcels are spaced a predetermined distance apart from each other (e.g., 200 mm), as indicated by decision 184 in FIG. 9. As perhaps best evidenced by viewing FIGS. 2 and 3 in reverse sequence, in instances where the image data does indicate the presence of multiple parcels, the image data will include data related to a first parcel 50a which has already been engaged and transferred to the place conveyor 16 and a second parcel 50b which still remains in the picking area 15 and in need of transfer. The predetermined distance may be selected based on the minimum amount of space between parcels needed for the first vision unit 31 to discern the first parcel 50a from the second parcel 50b and provide accurate location data regarding the location of the second parcel 50b which remains in the picking area 15.

Referring still to FIGS. 1-3, 5, and 9, if the controller 40 determines the first parcel 50a and the second parcel 50b were not spaced apart the predetermined distance, to facilitate the generation of more accurate location data for the second parcel 50b remaining in the picking area 15, the controller 40 will communicate instructions which cause a new cycle of the above-described parcel transfer routine to begin, thus causing the target camera 34 to acquire an additional image of the second parcel 50b within the picking area 15 and the first vision unit 31 to process the same. If, on the other hand, the controller 40 determines the first parcel 50a and the second parcel 50b were spaced apart the predetermined distance, the system 10 avoids such additional image acquisition and processing steps. Rather, the controller 40 will determine which robot has priority with respect to engaging and transferring the second parcel 50b and then communicates instructions which cause the robot determined to have priority to engage and transfer the second parcel 50b to the place conveyor 16, as indicated by decision 186 and blocks 188, 190 in FIG. 9. Following transfer of the second parcel 50b to the place conveyor 16, the controller 40 will communicate instructions to restart the confirmation routine (the start of which being indicated by block 150 in FIG. 8). The parcel transfer and confirmation routines outlined in FIGS. 7, 8, and 9, respectively, can then be repeated to transport any remaining parcels in within the system 10 and in need of transfer to the place conveyor 16.

By conditioning engagement of the first vision unit 31 to acquire and process additional images of the picking area 15 in the above-described manner, instead of acquiring and processing a new image prior to the transfer of each parcel positioned in the picking area 15, the system 10 is able to significantly reduce downtime associated with image acquisition and processing and increase parcel transfer throughput. For example, assuming it takes approximately 250 milliseconds (ms) for the first vision unit 31 to acquire and process an image of the picking area 15 and parcels located therein, and there are 50 instances within an hour in which parcels within the picking area 15 satisfy the above-described spacing conditions, then the system 10 will save approximately 12,500 ms (12.5 seconds) of image acquisition and processing time per hour. If it is assumed that it takes an average of approximately two seconds for the above-described parcel transfer and confirmation routines to be carried out, then the system 10 will be able to transfer approximately 6.25 more parcels per hour than if the first vision unit 31 were required to acquire and process an image each time a parcel was in need of transfer.

Figure 10:
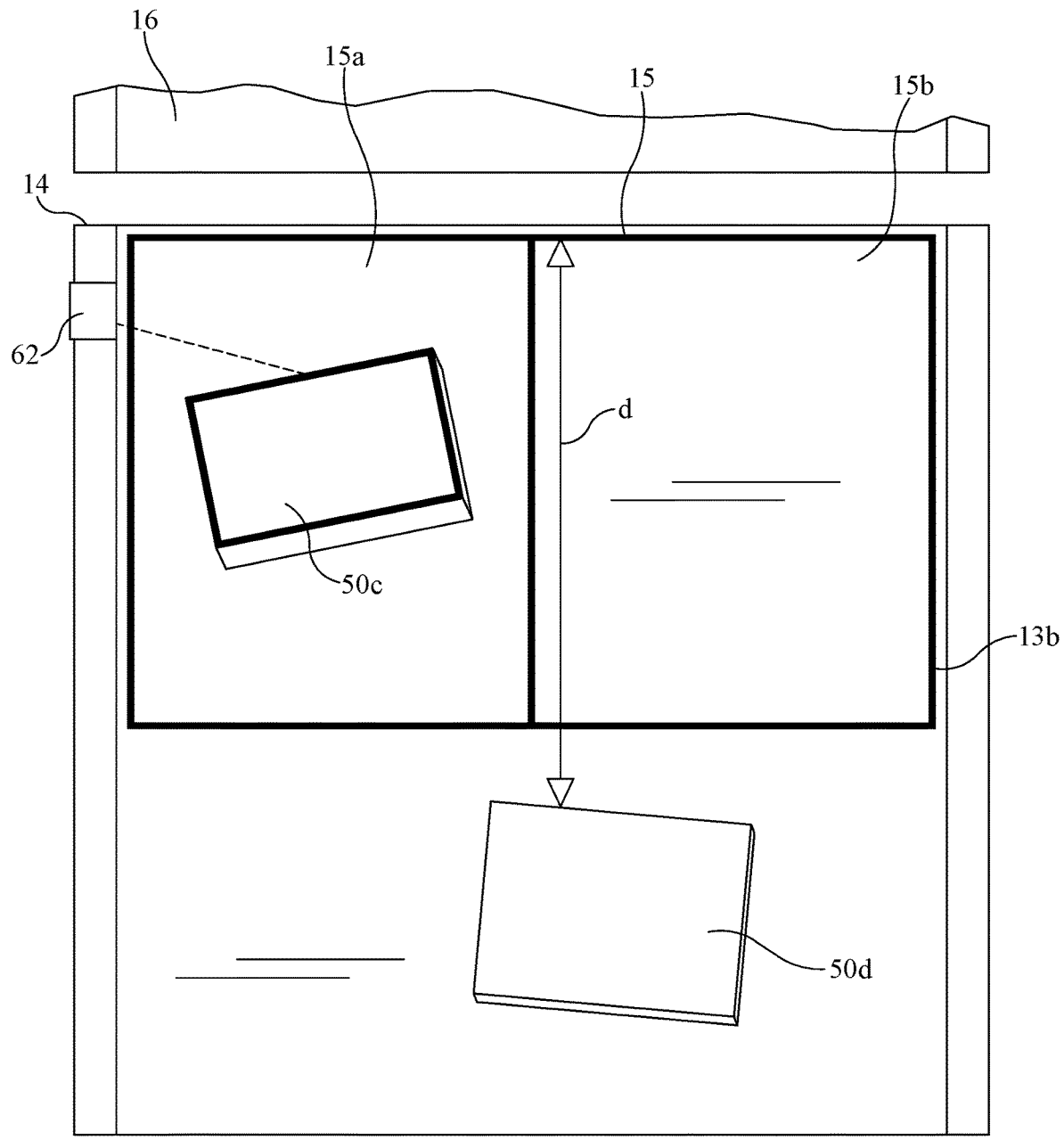
FIG. 10 is another top view of the pick conveyor of the exemplary conveyor system of FIG. 1.

FIG. 10 is another top view of the pick conveyor of the exemplary conveyor system 10 of FIG. 1.

Figure 11:
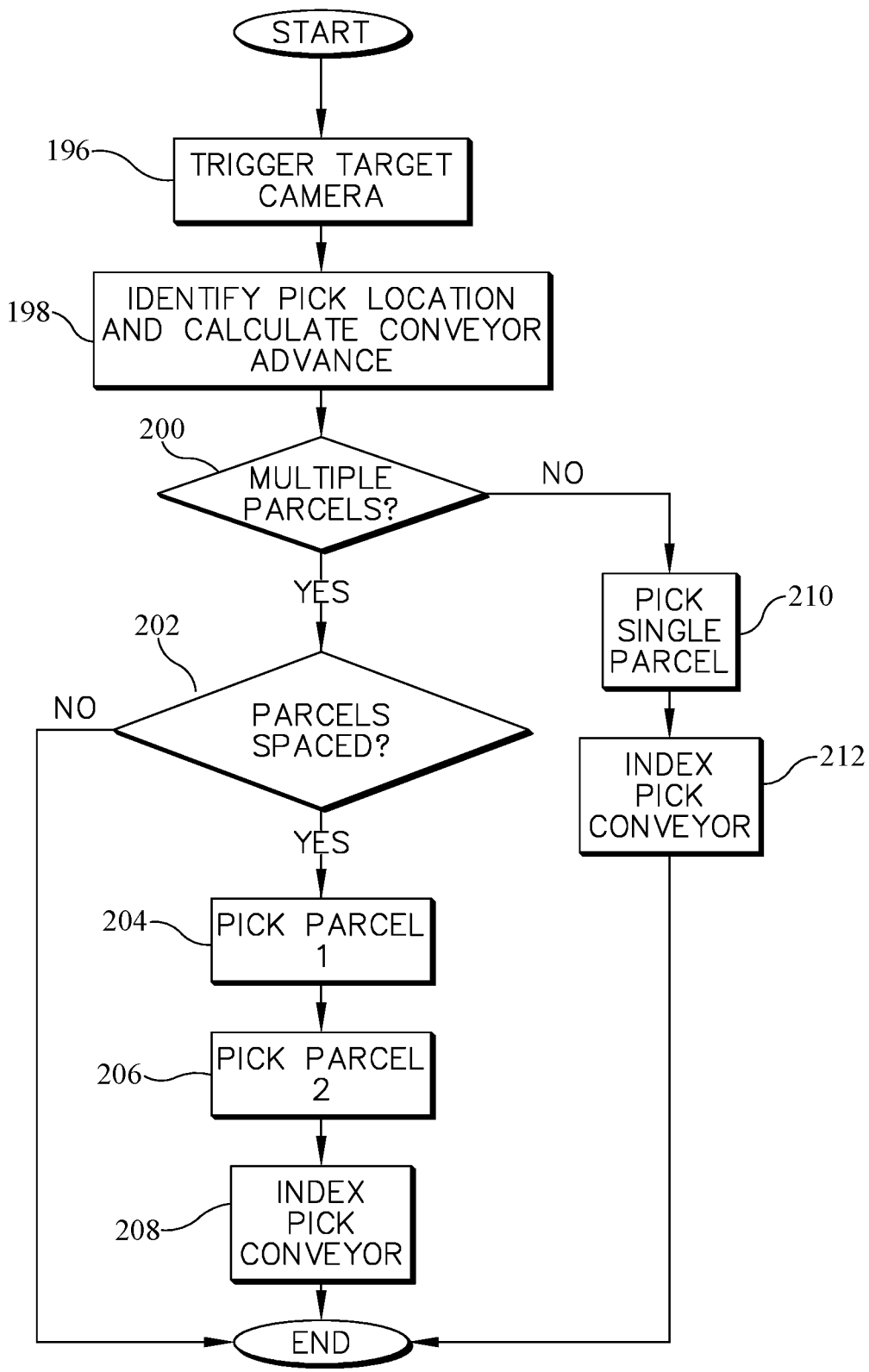
FIG. 11 is an exemplary subroutine for indexing the pick conveyor of the exemplary conveyor system of FIG. 1.

FIG. 11 is an exemplary subroutine, which can be executed by the system 10 to pick a parcel from the picking area 15 and index the pick conveyor 14 during the parcel transfer routine.

Referring now to FIGS. 7, 9 and 11, in this exemplary embodiment, the system 10 selectively employs a parcel pick and index subroutine during the process of transferring parcels from the pick conveyor 14 to the place conveyor 16 in order to reduce downtime associated with the transfer of parcels to the picking area 15 of the pick conveyor 14. In this regard, the pick and index subroutine reduces such downtime by causing at least the pick conveyor 14 to be indexed a calculated distance to move a parcel located upstream of the picking area 15 (e.g., parcel 50d in FIG. 10) into the picking area 15 immediately following (i.e. substantially simultaneously with) another parcel (e.g., parcel 50c in FIG. 10) being removed from the picking area 15 by either the first robot 20 or the second robot 22. As the calculated distance is determined prior to indexing the pick conveyor 14 to move the upstream parcel into the picking area 15, the calculated distance may also be characterized as a "predetermined distance." In this exemplary embodiment, such pick and index subroutine is effectuated by the vision and control subsystem 30 executing the pick and index subroutine outlined in in FIG. 11, which is preferably implemented within and defines a portion of the parcel transfer routine described above with reference to FIG. 7. As such, it should be appreciated that the respective actions and determinations made during the pick and index subroutine show in FIG. 11 may occur at different times within the parcel transfer routine outlined within FIG. 7. It should also be appreciated that the respective actions and determinations outlined in FIG. 11 may not necessarily occur immediately following each other, but rather, in some cases, may be temporally spaced apart from each other by the occurrence of certain actions or determinations within the parcel transfer routine outlined in FIG. 7. Furthermore, it should be appreciated that certain actions of the subroutine outlined in FIG. 11 may coincide with or correspond to actions within the parcel transfer routine outlined in FIG. 7.

Referring now specifically to FIGS. 10 and 11, the pick and index subroutine commences with the target camera 34 being selectively activated in response to instructions (or signals) communicated from the controller 40 to acquire an image of the picking area 15 and any parcels located therein, such as parcels 50c and 50d in FIG. 10, as indicated by block 196 in FIG. 11. Although indicated with separate reference numerals, it is appreciated that, in some embodiments, the selective activation of the target camera 34 indicated by block 196 in FIG. 11 may correspond to the selective activation of the target camera 34 indicated by block 120 in FIG. 7. Based on the image data received from the first vision unit 31 after processing the image acquired by the target camera 34, the controller 40 proceeds to identify the location of a parcel to be transferred to the place conveyor 16 (e.g., in the manner described above with reference to decisions 126, 128, 130 and blocks 132, 134 in FIG. 7) and calculate the total distance (as indicated by double-headed arrow, d, in FIG. 10) which the pick conveyor 14 must be indexed to move a parcel located upstream of the picking area 15 (e.g., parcel 50d in FIG. 10) into the picking area 15, as indicated by block 198 in FIG. 11. In this exemplary embodiment, the total distance, d, calculated by the controller 40 is based, at least in part, on image data received by the controller 40 corresponding to an image obtained by the target camera 34.

Referring still to FIGS. 10 and 11, prior to indexing the pick conveyor 14 the calculated total distance, d, the controller 40 determines whether a single or multiple parcels must be transferred from the picking area 15 prior to indexing of the pick conveyor 14, as indicated by decision 200 in FIG. 11. If, the controller 40 determines only a single parcel is currently in need of transfer (e.g., as shown in FIG. 10), the controller 40 will communicate instructions which cause that parcel to be engaged and transferred out of the picking area 15 by either the first robot 20 or the second robot 22, as well as instructions which cause the pick conveyor to be indexed the calculated total distance, d, immediately following the parcel being removed from the picking area 15. If, however, the controller 40 determines that the parcel was not successfully engaged and transferred out of the picking area 15 (e.g., in the manner described above with reference to decisions 140, 142, 144, 146 in FIG. 7), the pick and move routine will be aborted.

Referring still to FIGS. 10 and 11, if the controller 40 determines multiple parcels are in need of transfer, the controller 40 will proceed to determine whether the parcels are spaced a predetermined distance apart from each other (e.g., 200 mm), as indicated by decision 202 in FIG. 11. If the parcels are determined not to be spaced apart from each other the predetermined distance, then the pick and index subroutine is aborted. Conversely, if the controller 40 determines that the parcels are spaced apart from each other the predetermined distance, the controller 40 will communicate instructions which cause each of the parcels to be engaged and transferred out of the picking area 15 by either the first robot 20 or the second robot 22, and also cause the pick conveyor 14 to be indexed the calculated total distance, d, immediately following the transfer of the last parcel within the picking area 15, as indicated by blocks 204, 206, 208 in FIG. 11. If, however, the controller 40 determines that any of the parcels were not successfully engaged and transferred out of the picking area 15 (e.g., in the manner described above with reference to decisions 140, 142, 144, and 146 in FIG. 7), the pick and move routine will be aborted.

Although not reflected in the subroutine outlined in FIG. 11, in some embodiments, indexing of the pick conveyor 14 may be prematurely stopped if, during the indexing of the pick conveyor 14, the controller 40 receives readings from the sensor 62 which indicate one or more parcels are located within the picking area 15 to avoid parcel overflow (e.g., parcels being conveyed off of the pick conveyor 14 and/or onto the place conveyor 16). In this regard, upon receiving readings from the sensor 62 indicating the presence of one or more parcels in the picking area 15, the controller 40 will communicate instructions which cause indexing of the place conveyor 16 to stop. Additionally, embodiments are also contemplated in which the upstream conveyor 12 is also indexed at the same time as the pick conveyor 14 during the pick and index subroutine.

As an example of improved parcel throughput rate, during an initial assessment of throughput generated by the above-described system 10 executing the routines and subroutines in the manner described above during a predetermined time interval, as compared to the throughput data generated by a system employing only a single robot singulator to singulate and transfer parcels from one conveyor to another during that same time interval, it was found that the system 10 of the present invention was able to singulate and transfer a total of approximately 2,000 parcels while the single robot singulator system was only able to singulate and transfer a total of approximately 1,500 parcels. Based on the foregoing data, the system 10 of the present invention thus exhibited an improved parcel transfer throughput rate of approximately 25% compared to the single robot singulator system.

It should also appreciated that the first robot 20, the second robot 22, and the vision and control subsystem 30 may be utilized in conjunction with alternative conveyor arrangements and with some or all of the above-described routines and subroutines similarly executed to accommodate different sorting applications and/or further improve parcel transfer throughput rate. In this regard, FIGS. 12-19 show various alternative conveyor systems 300, 400, 500, 600, 700, 800, 900, 1000 which also utilize multiple robot singulators to transfer and singulate parcels. Throughout the present application, like components are provided with like reference numerals. Although not shown in FIGS. 12-18, it is appreciated that the various conveyor systems 300, 400, 500, 600, 700, 800, 900, 1000 shown within such figures would also include and utilize the vision and control subsystem 30 described above. Further, to avoid unnecessary repetition, it is appreciated that embodiments are contemplated in which some or all of the respective conveyors referred to in the discussion of systems 300, 400, 500, 600, 700, 800, 900, 1000 below are operably connected to the controller 40 of the vision and control subsystem 30, such that the controller 40 can communicate instructions to control operation of such conveyors.

Figure 12:
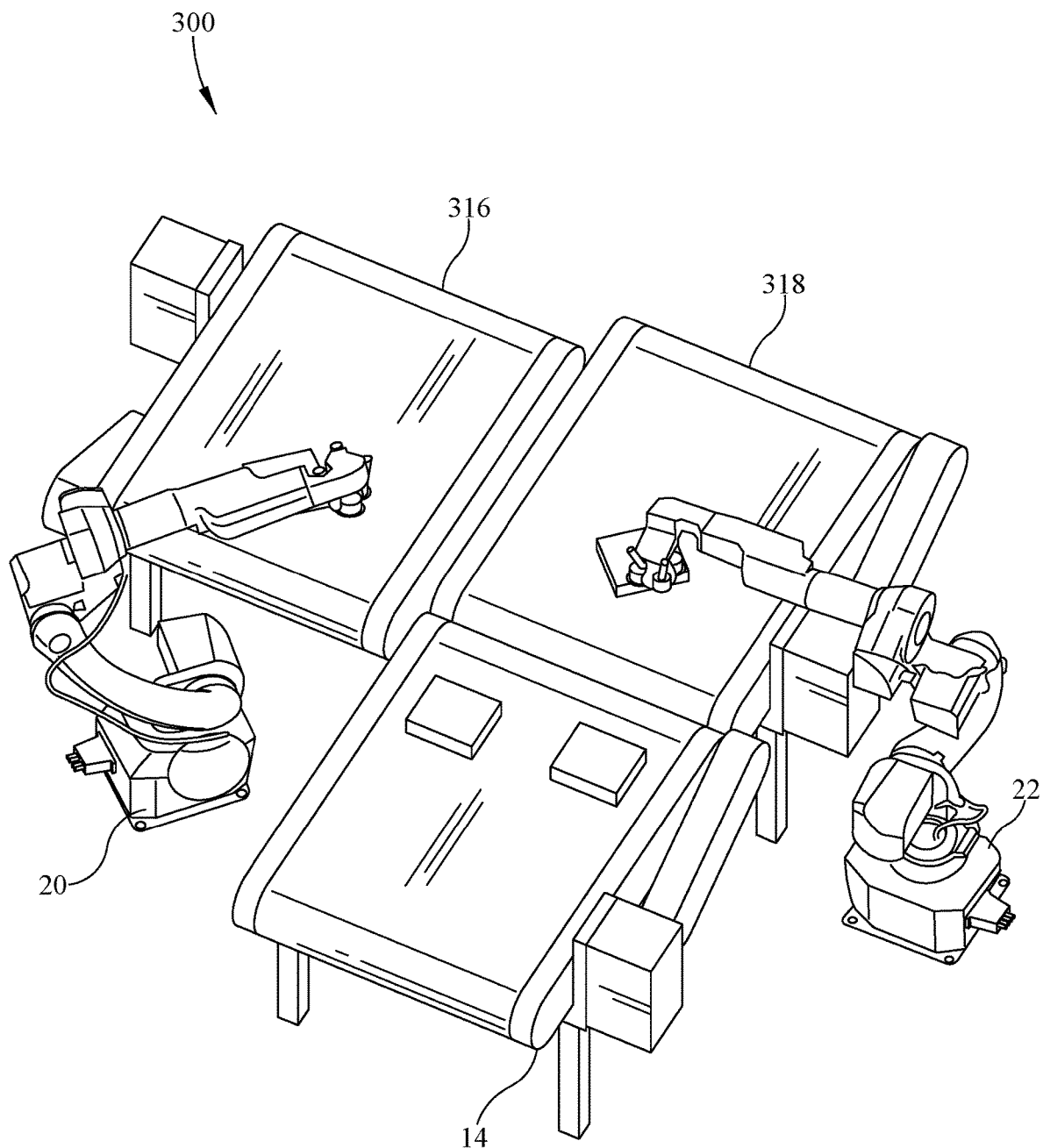
FIG. 12 is a perspective view of another exemplary conveyor system made in accordance with the present invention, which includes multiple robot singulators.

Referring now to FIG. 12, this conveyor system 300 (or system 300) includes the pick conveyor 14, the first robot 20, and the second robot 22. Unlike the system 10 described above with reference to FIGS. 1 and 2, however, the place conveyor in this system 300 is defined by, and thus can be characterized as including, multiple conveyors. Specifically, in this exemplary embodiment, the place conveyor of the system 300 includes: a first place conveyor 316, which receives parcels from the first robot 20; and a second place conveyor 318, which receives parcels from the second robot 22 and is positioned in side-by-side relation to the first place conveyor 316. By virtue of the first robot 20 and the second robot 22 delivering parcels to separate conveyors, the parcel transfer rate from the pick conveyor 14 is further increased as two separate parcels can be transferred (one by the first robot 20 and the other by the second robot 22) simultaneously or close temporal proximity without risk of the two parcels becoming stacked on top of each other or otherwise positioned in a non-singulated manner. Furthermore, unlike the system 10 described above with reference to FIGS. 1 and 2, in this system 300, the first robot 20 and the second robot 22 are mounted to a ground surface in an upright instead of inverted position.

Figure 13:
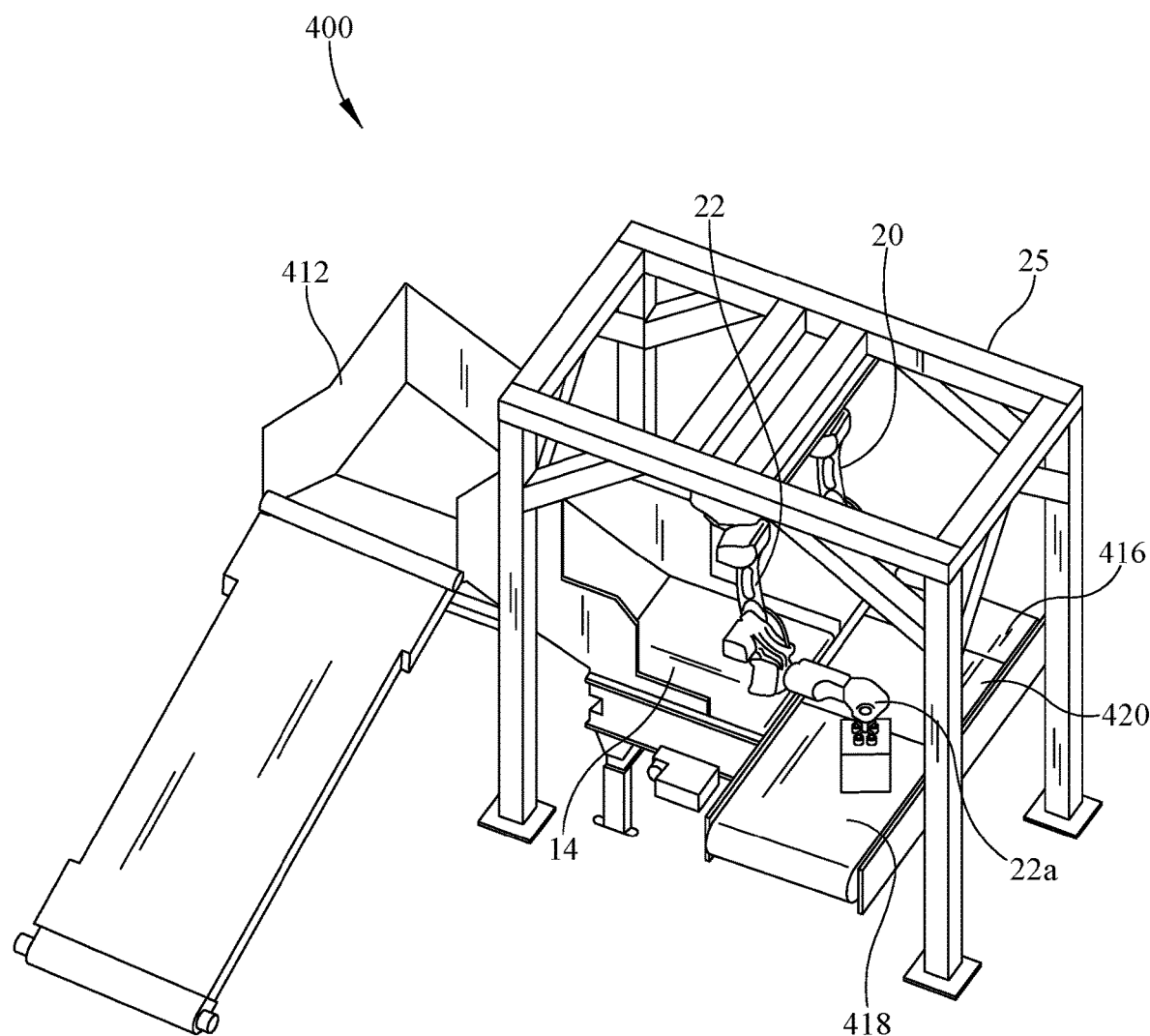
FIG. 13 is a perspective view of another exemplary conveyor system made in accordance with the present invention, which includes multiple robot singulators.

Referring now to FIG. 13, like the system 300 described above with reference to FIG. 12, this conveyor system 400 (or system 400) also includes a place conveyor 416, 418, which is defined by, and thus can be characterized as including: a first place conveyor 416, which receives parcels from the first robot 20; and a second place conveyor 418, which receives parcels from the second robot 22. However, unlike the system 300 described above with reference to FIG. 12, in this system 400, the first place conveyor 416 and the second place conveyor 418 are linearly arranged, such that a parcel transferred to the first place conveyor 416 is subsequently conveyed downstream for eventual receipt by the second place conveyor 418. In this exemplary embodiment, the system 400 further includes a buffering conveyor 420 positioned between the first place conveyor 416 and the second place conveyor 418, which can be selectively indexed (i.e., to be moved a predetermined distance and/or to be driven for a predetermined period of time) to regulate the rate at which parcels offloaded by the first place conveyor 416 are subsequently transferred to the second place conveyor 418. Indeed, via use of the buffering conveyor 420, the first robot 20 can continue to place parcels on the first place conveyor 416, with those parcels then being conveyed downstream to the second place conveyor 418 via the buffering conveyor 420, even when the second robot 22 is not operating. Furthermore, it should also be noted that more than one buffering conveyor could be positioned between the first place conveyor 416 and the second place conveyor 418, with each buffering conveyer being independently controlled, to allow for greater control of movement of parcels from the first place conveyor 416 to the second place conveyor 418.

Referring still to FIG. 13, in this system 400, the upstream conveyor 412 is a chute which defines an inclined pathway along which a bulk flow of parcels can slide downward (under the force of gravity) toward the pick conveyor 14. As such, in this exemplary embodiment, it is not necessary for the upstream conveyor 412 to be indexed for parcels loaded thereon to be delivered to the pick conveyor 14. The foregoing arrangement may serve to improve parcel transfer throughput by reducing downtime associated with the pick conveyor 14, and thus first robot 20 and the second robot 22, waiting to receive parcels from upstream conveyor 412.

Figure 14:
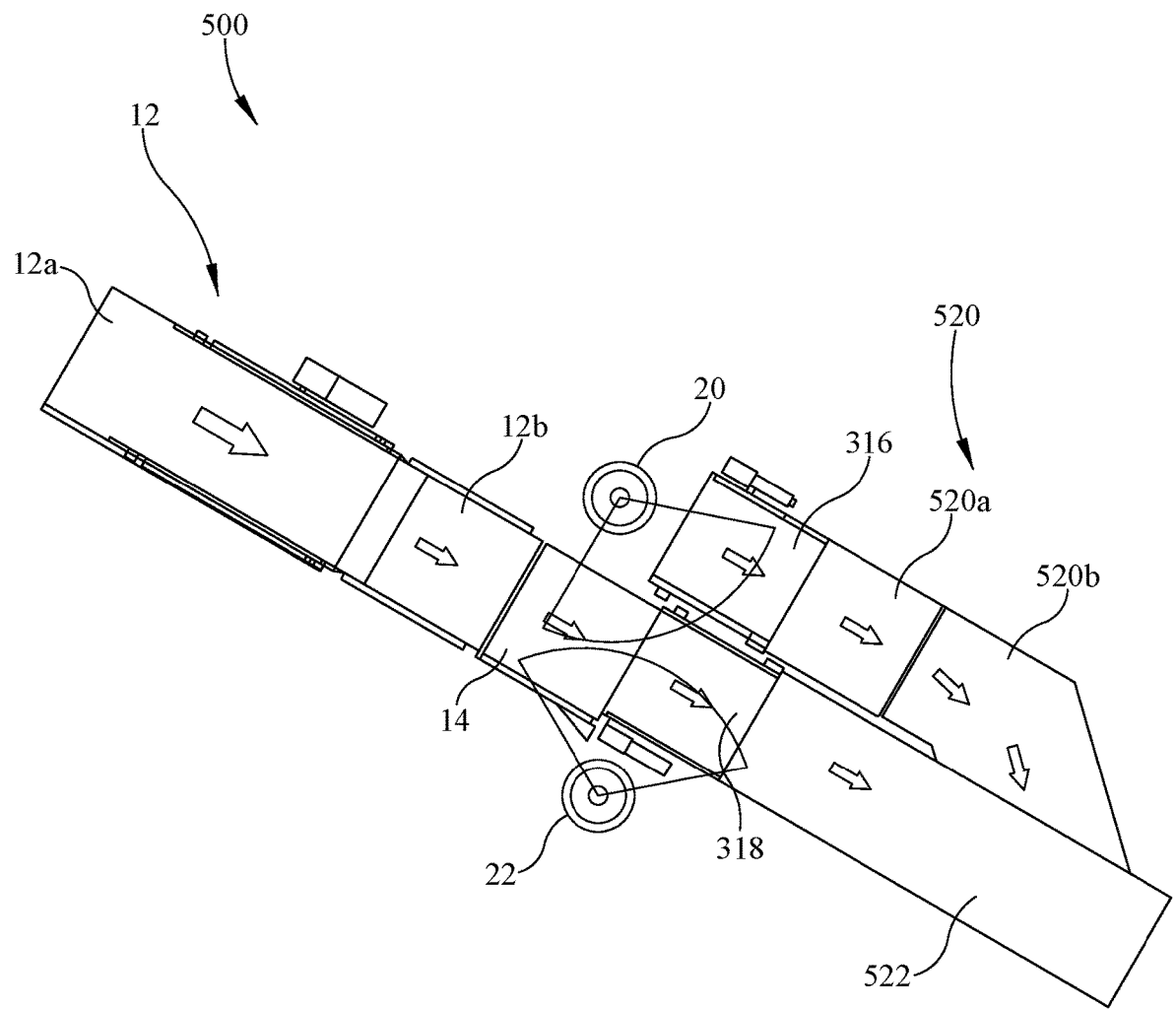
FIG. 14 is a schematic view of another exemplary conveyor system made in accordance with the present invention, which includes multiple robot singulators.

Referring now to FIG. 14, this conveyor system 500 (or system 500) includes the same components as the system 300 described above with reference to FIG. 12, and further includes the upstream conveyor 12 of the system 10 described above with references to FIGS. 1, 2, and 5, a first downstream conveyor 520 positioned downstream of the first place conveyor 316, and a second downstream conveyor 522 positioned downstream of the second place conveyor 318. In this exemplary embodiment, the second downstream conveyor 522 is defined by a first induction conveyor which receives parcels offloaded from both the second place conveyor 318 and the first downstream conveyor 520. In this exemplary embodiment, the first downstream conveyor 520 is defined by, and thus can be characterized as including, a second induction conveyor 520a and a merge conveyor 520b. The second induction conveyor 520a is positioned downstream of the first place conveyor 316 so that parcels offloaded from the first place conveyor 316 are directed onto the second induction conveyor 520a. The merge conveyor 520b has a proximal end positioned downstream of the second induction conveyor 520a to receive parcels offloaded therefrom and a distal end positioned adjacent to the second downstream conveyor 522, such that parcels offloaded form the merge conveyor 520b are directed onto the second downstream conveyor 522.

Figure 15:
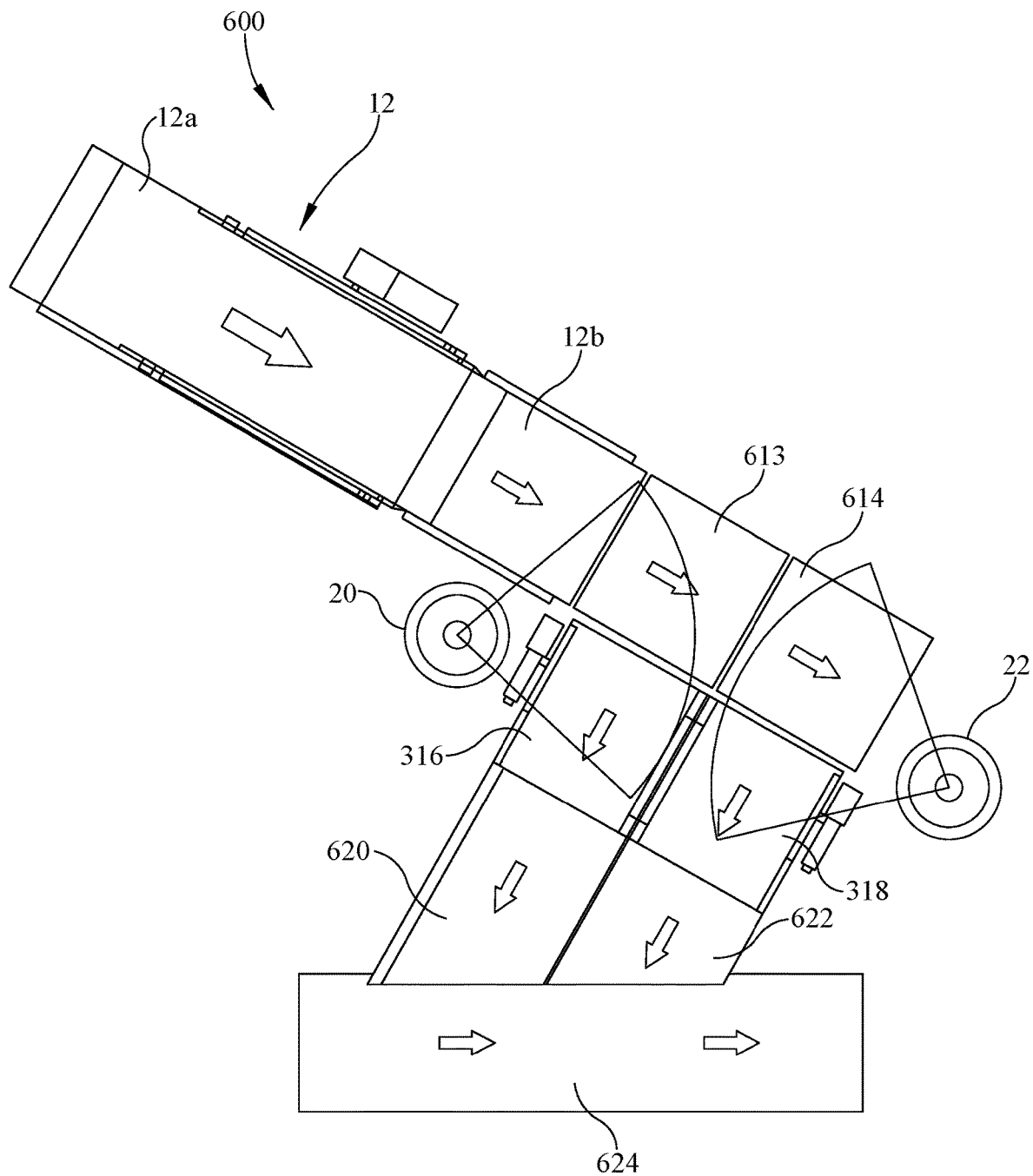
FIG. 15 is a schematic view of another exemplary conveyor system made in accordance with the present invention, which includes multiple robot singulators.

Referring now to FIG. 15, this conveyor system 600 (or system 600) includes: the upstream conveyor 12 of the system 10 described above with references to FIGS. 1, 2, and 5; the first and second place conveyors 316, 318 of systems 300 and 500 described above with reference to FIGS. 12 and 14, respectively; a first induction conveyor 620; a second induction conveyor 622, and a pitch and catch conveyor 624. Unlike systems 10, 300, 400, and 500 described above, in this system 600, the pick conveyor is defined by, and thus can be characterized as including, a first pick conveyor 613 and a second pick conveyor 614. The first pick conveyor 613 is positioned immediately downstream of the upstream conveyor 12 and the second pick conveyor 614 is positioned immediately downstream of the first pick conveyor 613. As such, in this exemplary embodiment, parcels which are not transferred off of the first pick conveyor 613 are subsequently directed onto the second pick conveyor 614. In this exemplary embodiment, the first robot 20 is configured to engage and transfer parcels from the first pick conveyor 613 to the first place conveyor 316, and the second robot 22 is configured to engage and transfer parcels from the second pick conveyor 614 to the second place conveyor 318.

Referring still to FIG. 15, the first induction conveyor 620 is positioned immediately downstream of the first place conveyor 316 so that parcels offloaded from the first place conveyor 316 are directed onto the first induction conveyor 620. Similarly, the second induction conveyor 622 is positioned immediately downstream of the second place conveyor 318 so that parcels offloaded from the second place conveyor 318 are directed onto the second induction conveyor 622. The pitch and catch conveyor 624 is positioned immediately downstream and conveys parcel in a different direction, which in this case, is generally perpendicular to, the direction in which the first induction conveyor 620 and the second induction conveyor 622 convey parcels. As a result of such change in direction, parcels offloaded from the first induction conveyor 620 or the second induction conveyor 622 onto the pitch and catch conveyor 624 are automatically reoriented in a manner which may be more amenable for subsequent sorting processes. For example, in some implementations, the pitch and catch conveyor 624 may serve to reorient parcels offloaded from the first induction conveyor 620 and the second induction conveyor 622 in a manner which causes such parcels to more readily fit into a tilt tray conveyor (not shown) positioned downstream of the pitch and catch conveyor 624. The automatic reorientation facilitated by the pitch and catch conveyor 624 may thus serve to reduce or alleviate the need for the first robot 20 and the second robot 22 to reorient parcels transferred to the first place conveyor 316 and the second place conveyor 318, respectively.

Figure 16:
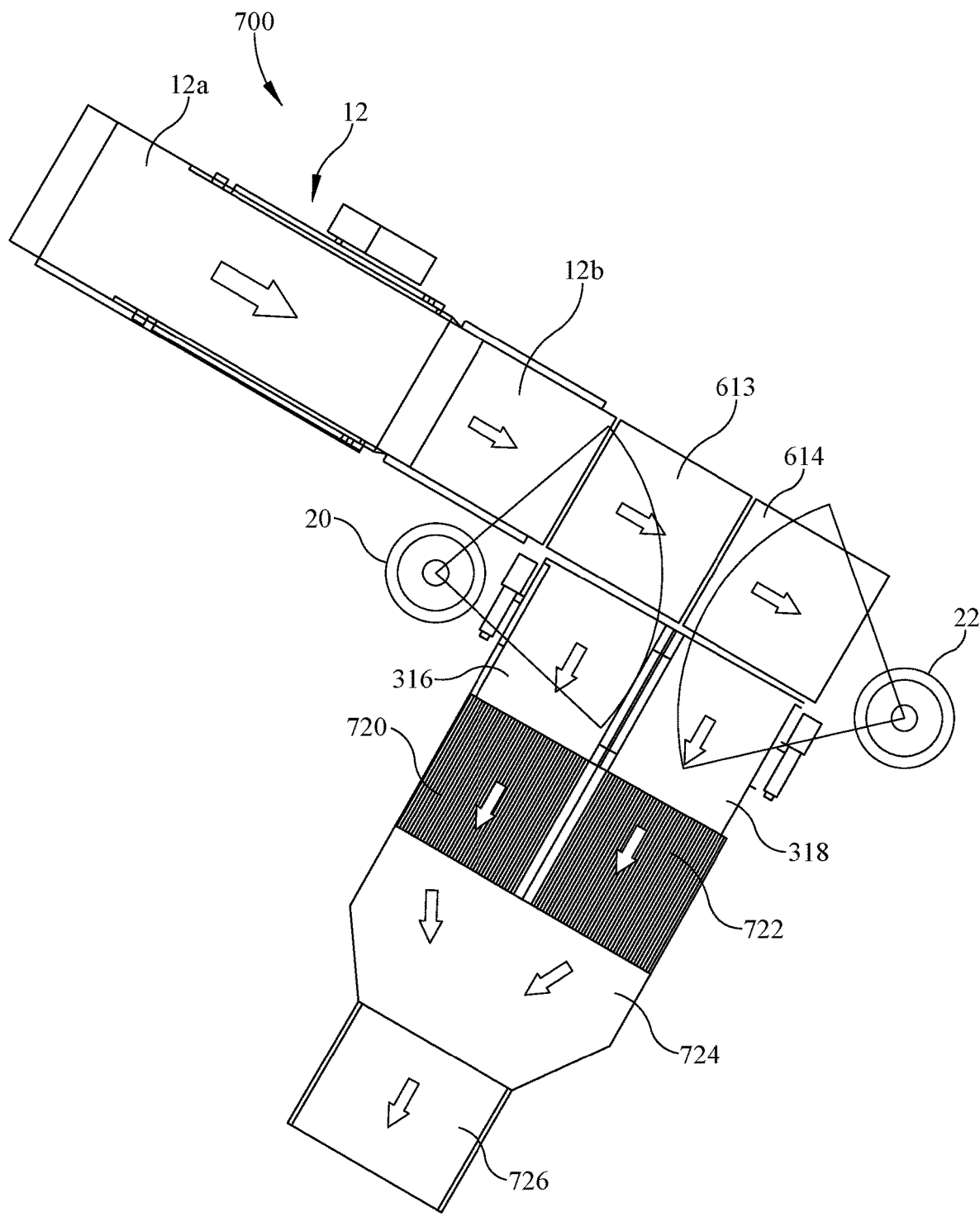
FIG. 16 is a schematic view of another exemplary conveyor system made in accordance with the present invention, which includes multiple robot singulators.

Referring now to FIG. 16, this conveyor system 700 (or system 700) includes the same conveyor arrangement as the system 600 described above with reference to FIG. 15, except for the conveyors positioned downstream of the first place conveyor 316 and the second place conveyor 318. In this regard, the system 700 includes a first strip belt conveyor 720 positioned immediately downstream of the first place conveyor 316 and a second strip belt conveyor 722 positioned immediately downstream of the second place conveyor 318. The first strip belt conveyor 720 and the second strip belt conveyor 722 each comprise a plurality of belts, which can be driven at different speeds to reorient parcels in a desired manner while being transported by the first strip belt conveyor 720 and the second strip belt conveyor 722. This system further includes a center merge conveyor 724 that is positioned immediately downstream of the first strip belt conveyor 720 and the second strip belt conveyor 722 and is configured to center parcels offloaded from such conveyors. The automatic reorientation facilitated by the first strip belt conveyor 720, the second strip belt conveyor 722, and the center merge conveyor 724 may serve to reduce or alleviate the need for the first robot 20 and the second robot 22 to reorient parcels transferred to the first place conveyor 316 and the second place conveyor 318, respectively. In this exemplary embodiment, the system 700 further includes an induction conveyor 726 positioned immediately downstream of the center merge conveyor 724 to convey parcels offloaded from the center merge conveyor 724 for subsequent processing.

Figure 17:
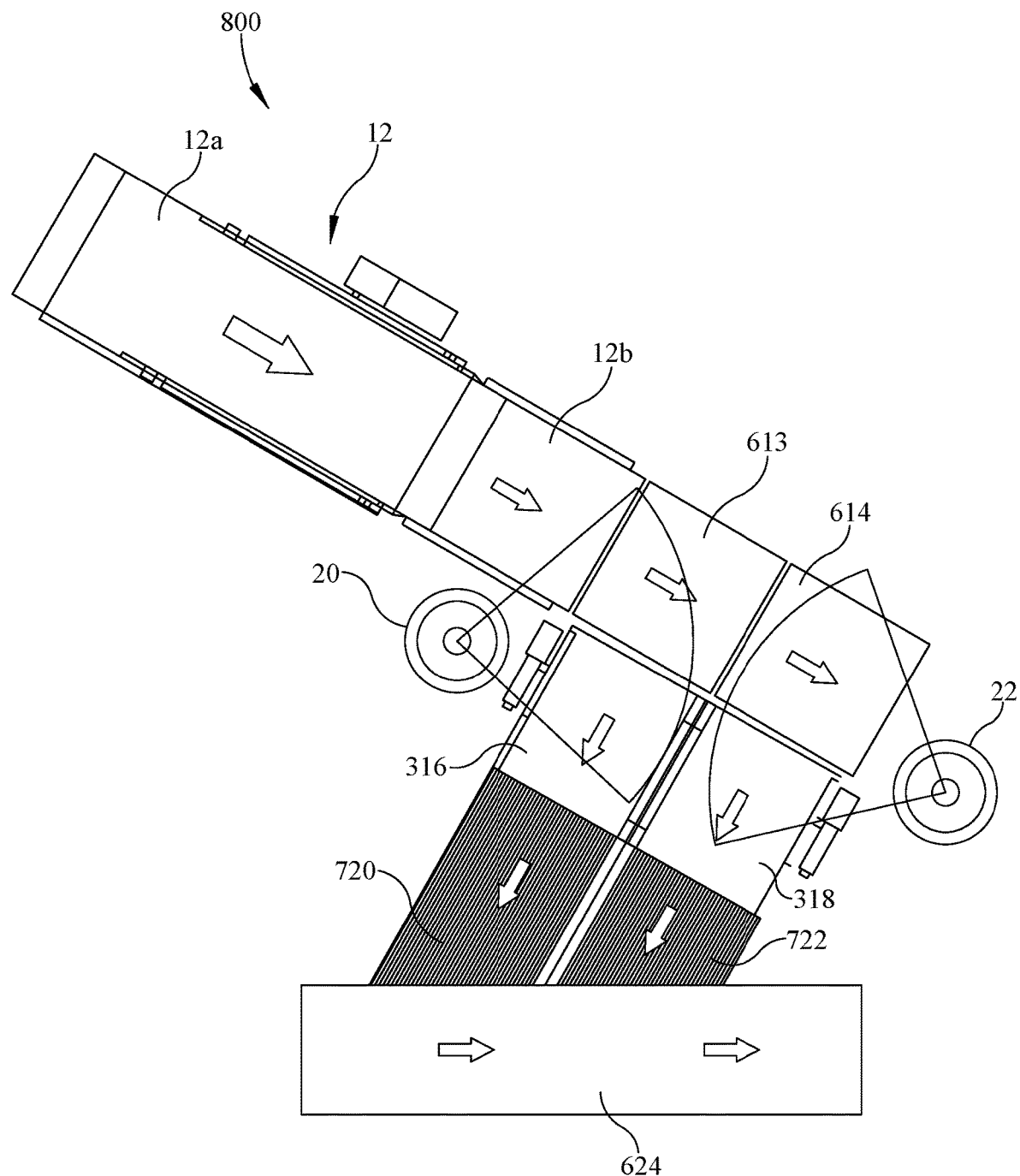
FIG. 17 is a schematic view of another exemplary conveyor system made in accordance with the present invention, which includes multiple robot singulators.

Referring now to FIG. 17, this conveyor system 800 (or system) includes the same conveyor arrangement as the system 700 described above with reference to FIG. 16, except that the center merge conveyor 724 and the induction conveyor 726 are removed and substituted with the pitch and catch conveyor 624 of system 600 described above with reference to FIG. 15. The automatic reorientation facilitated by the first strip belt conveyor 720, the second strip belt conveyor 722, and the pitch and catch conveyor 624 may serve to reduce or alleviate the need for the first robot 20 and the second robot 22 to reorient parcels transferred to the first place conveyor 316 and the second place conveyor 318, respectively.

Figure 18:
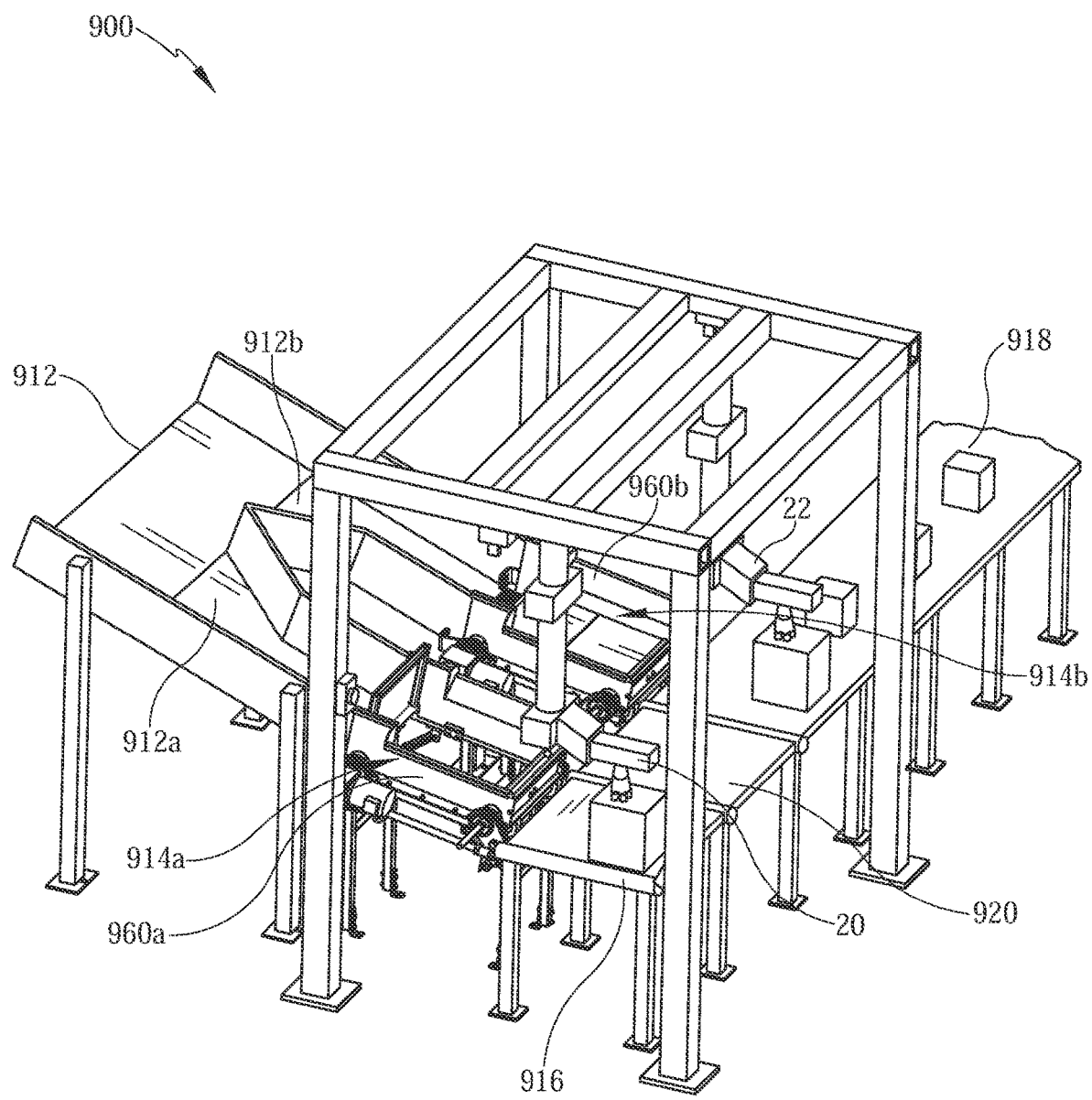
FIG. 18 is a perspective view of another exemplary conveyor system made in accordance with the present invention, which includes multiple robot singulators and a buffering conveyor.

Referring now to FIG. 18, this conveyor system 900 (or system 900) includes a similar conveyor arrangement as the system 400 described above with reference to FIG. 13, except that a different upstream conveyor 912 is utilized, and the positioning of the first place conveyor 916 and the second place conveyor 918 relative to the buffering conveyor 920 has been reversed. Similar to the system 400 described above with reference to FIG. 13, the buffering conveyor 920 controls movement of the parcels from the first place conveyor 916 to the second place conveyor 918. In this regard, in at least some embodiments, the buffering conveyor 920 would also be operably connected to and operate in response to instructions (signals) received from the controller 40 (FIG. 5). Furthermore, it should again be noted that more than one buffering conveyor could be positioned between the first place conveyor 416 and the second place conveyor 418, with each buffering conveyer being independently controlled by the controller 40 (FIG. 5).

Referring still to FIG. 18, like the upstream conveyor 412 of the system 400 described above with reference to FIG. 13, the upstream conveyor 912 in this system 900 is also a chute which defines an inclined pathway along which a bulk flow of parcels can slide downward (under the force of gravity). However, instead of delivering a bulk flow of parcels to a single picking conveyor, in this system 900, the chute of the upstream conveyor 912 is split into two sections 912a, 912b to divide the bulk flow of parcels into discrete batches, directing the batches to either a first picking area 914a or a second picking area 914b. In this exemplary embodiment, the first robot 20 is configured to engage and transfer parcels from the first picking area 914a to the first place conveyor 916 (in response to instructions (signals) received from the controller 40), and the second robot 22 is configured to engage and transfer parcels from the second picking area 914b to the second place conveyor 918 (in response to instructions (signals) received from the controller 40). In this regard, the first picking area 914a is aligned with the first place conveyor 916, and the second picking area 914b is aligned with the second place conveyor 918. Accordingly, instead of picking parcels from a single area in which all of the parcels within the bulk flow of parcels are delivered, in this system 900, the first robot 20 and the second robot 22 pick from separate areas in which discrete batches of parcels from the bulk flow of parcels are received.

Referring still to FIG. 18, in this exemplary embodiment, the first picking area 914a and the second picking area 914b are defined by a first trapdoor rejection mechanism 960a and a second trapdoor rejection mechanism 960b, respectively. Each trapdoor rejection mechanism 960a, 960b is configured to be selectively transitioned between a closed position and an open position. In use, each respective trapdoor rejection mechanism 960a, 960b is ordinarily in the closed position to temporarily support parcels directed to the trapdoor rejection mechanism prior to subsequent transfer by the first robot 20 or the second robot 22, but can selectively be transitioned to the open position to cause parcels identified as "unconveyable" to pass through the trapdoor rejection mechanism 960a, 960b. As such, each trapdoor rejection mechanism 960a, 960b is operably connected to the controller 40, such that each trapdoor rejection mechanism 960a, 960b can be selectively transitioned between the closed position and the open position in response to instructions (or signals) communicated from the controller 40. Suitable trapdoor rejection mechanisms which may be utilized within the system 900 include those described in U.S. patent application Ser. No. 17/748,479, which is incorporated herein by reference.

Referring still to FIG. 18, in this exemplary embodiment, parcels are delivered to the first robot 20 and the second robot 22 in a first direction, while the first place conveyor 916 and the second place conveyor 918 receive and transfer parcels away from the first robot 20 and the second robot 22 in a second direction, which is substantially perpendicular to the first direction.

Figure 19:
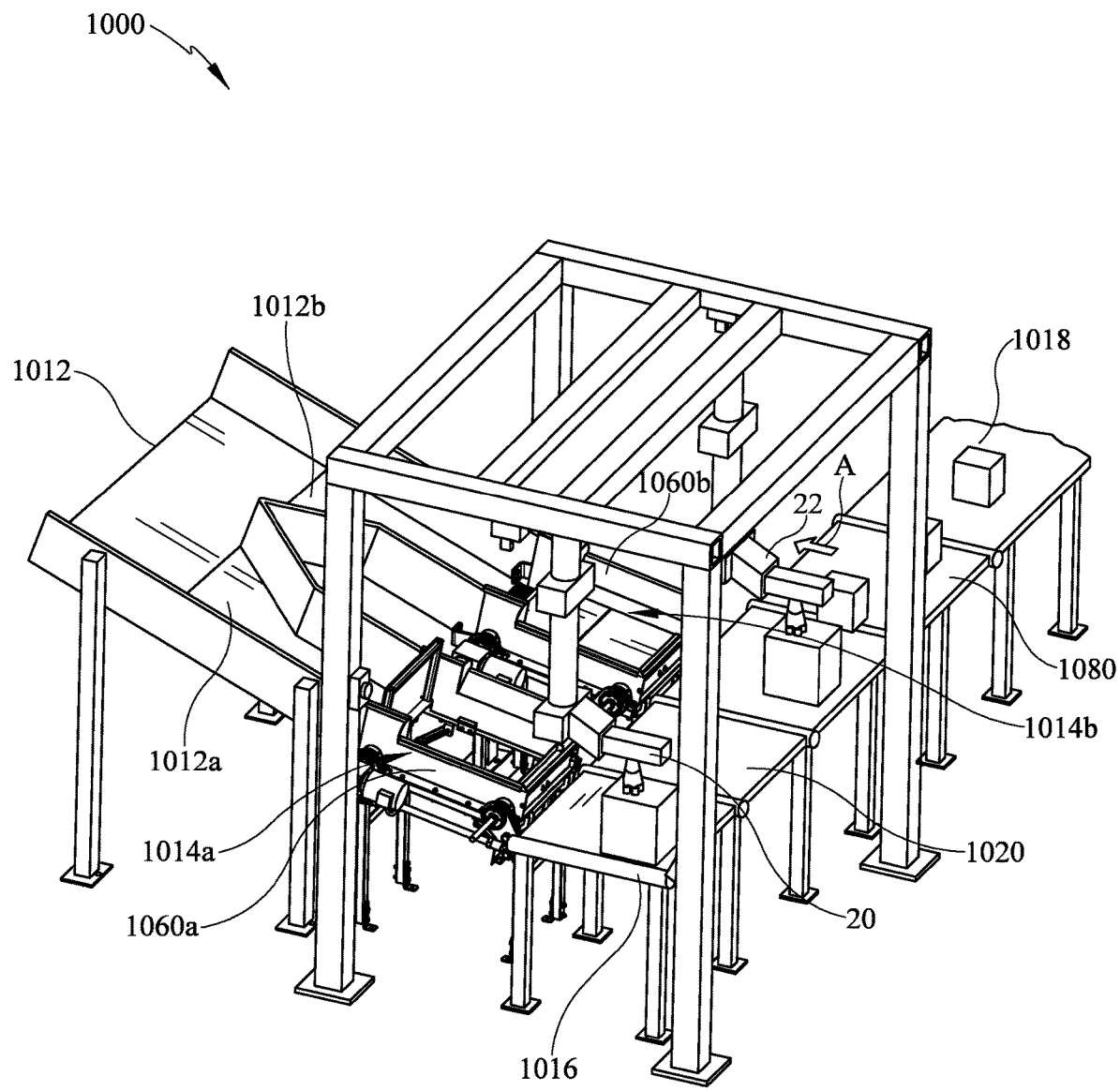
FIG. 19 is a perspective view of another exemplary conveyor system made in accordance with the present invention, which includes multiple robot singulators and a buffering conveyor.

Referring now to FIG. 19, this conveyor system 1000 (or system 1000) is substantially identical to that described above with reference to FIG. 18. The upstream conveyor 1012 in this system 1000 is also a chute which defines an inclined pathway along which a bulk flow of parcels can slide downward (under the force of gravity). Furthermore, the chute of the upstream conveyor 1012 is split into two sections 1012a, 1012b to divide the bulk flow of parcels into discrete batches, directing the batches to either a first picking area 1014a or a second picking area 1014b. In this exemplary embodiment, the first robot 20 is again configured to engage and transfer parcels from the first picking area 1014a to the first place conveyor 1016 (in response to instructions (signals) received from the controller 40), and the second robot 22 is configured to engage and transfer parcels from the second picking area 1014b to the second place conveyor 1018 (in response to instructions (signals) received from the controller 40). A buffering conveyor 1020 controls movement of the parcels from the first place conveyor 1016 to the second place conveyor 1018. In this regard, in at least some embodiments, the buffering conveyor 1020 would also be operably connected to and operate in response to instructions (signals) received from the controller 40 (FIG. 5).

Referring still to FIG. 19, in this exemplary embodiment, the first picking area 1014a and the second picking area 1014b are again defined by a first trapdoor rejection mechanism 1060a and a second trapdoor rejection mechanism 1060b, respectively. As in the exemplary system 900 described above with respect to FIG. 18, each trapdoor rejection mechanism 1060a, 1060b of the exemplary system 1000 is configured to be selectively transitioned between a closed position and an open position. In use, each respective trapdoor rejection mechanism 1060a, 1060b is ordinarily in the closed position to temporarily support parcels directed to the trapdoor rejection mechanism prior to subsequent transfer by the first robot 20 or the second robot 22, but can selectively be transitioned to the open position to cause parcels identified as "unconveyable" to pass through the trapdoor rejection mechanism 1060a, 1060b.

Referring still to FIG. 19, in this exemplary embodiment, there is an additional conveying module 1080 incorporated into the second place conveyor 1018, downstream of the location at which parcels are placed on the second place conveyor 1018 by the second robot 22. This additional conveying module 1080 is configured both to convey parcels along a longitudinal axis of the place conveyor 1018 and to selectively convey parcels in a transverse direction relative to the longitudinal axis, as indicated by arrow A in FIG. 19. For example, the module 1080 may be in the form of a belt with integrated rollers that effectuate the movement in the transverse direction. For another example, the module may be a divert and transfer module that is marketed and sold under the registered trademark MODSORT® by Regal Beloit America, Inc. Via use of this module 1080, parcels may be selectively moved out of the parcel flow on the second place conveyor 1018. In this regard, in at least some embodiments, the module 108 would also be operably connected to and operate in response to instructions (signals) received from the controller 40 (FIG. 5). For instance, if a parcel is successfully engaged and transferred by the first robot 20 or the second robot 22, but then is determined to be unconveyable for some reason (for example, is too heavy), the module 1080 can be activated to move the parcel in the transverse direction, where it can be discharged into a rejection chute (not shown) or otherwise delivered to another location for subsequent processing.

One of skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

The invention claimed is:

1. A conveyor system, comprising:
   a first robot singulator;
   a second robot singulator;
   a picking area from which parcels of a bulk flow of parcels can be engaged and transferred by the first robot singulator or the second robot singulator;
   a first place conveyor positioned downstream of the picking area and configured to receive parcels transferred by the first robot singulator;
   a second place conveyor positioned downstream of the picking area and the first place conveyor, the second place conveyor configured to receive parcels transferred by the second robot singulator and further configured to receive parcels from the first place conveyor;
   a buffering conveyor positioned between the first place conveyor and the second place conveyor for regulating a rate at which parcels offloaded by the first place conveyor are transferred to the second place conveyor; and
   a vision and control subsystem operably connected to the first robot singulator, the second robot singulator, and the buffering conveyor, the vision and control subsystem including a first camera for acquiring one or more images of the picking area and any parcels located in the picking area, and a controller including a processor for executing instructions stored in a memory component to (i) receive and process image data corresponding to an initial image of the picking area acquired by the first camera, (ii) selectively communicate instructions to the first robot singulator which cause the first robot singulator to engage and transfer parcels of the bulk flow of parcels positioned in the picking area to the first place conveyor, (iii) selectively communicate instructions to the second robot singulator which cause the second robot singulator to engage and transfer parcels positioned in the picking area to the second place conveyor, and (iv) selectively communicate instructions to the buffering conveyor which cause the buffering conveyor to index and transfer parcels from the first place conveyor to the second place conveyor.

2. The conveyor system according to claim 1, wherein the first robot singulator and the second robot singulator are each a six-axis robotic arm.

3. The conveyor system according to claim 1, wherein the picking area includes a first picking area and a second picking area, wherein the first robot singulator engages and transfers parcels positioned in the first picking area to the first place conveyor, and the second robot singulator engages and transfers parcels positioned in the second picking area to the second place conveyor.

4. The conveyor system according to claim 3, wherein the first picking area is aligned with the first place conveyor, and wherein the second picking area is aligned with the second place conveyor.

5. The conveyor system according to claim 3, wherein the first picking area is defined by a first section of a chute, and the second picking area is defined by a second section of the chute.

6. The conveyor system according to claim 1, wherein parcels are delivered to the first robot singulator and the second robot singulator in a first direction, and wherein the first place conveyor and the second place conveyor receive and transfer parcels away from the first robot singulator and the second robot singulator in a second direction, which is substantially perpendicular to the first direction.

7. The conveyor system according to claim 1, wherein the buffering conveyor comprises multiple buffering conveyors, with each of the multiple buffering conveyors being independently controlled by the vision and control subsystem to control movement of parcels from the first place conveyor to the second place conveyor.

8. The conveyor system according to claim 1, and further comprising an additional conveying module incorporated into the second place conveyor which is configured both to convey parcels along a longitudinal axis of the second place conveyor and to selectively convey parcels in a transverse direction relative to the longitudinal axis.

9. A conveyor system, comprising:
a first robot singulator;
a second robot singulator;
a picking area, including a first picking area from which parcels of a bulk flow of parcels can be engaged and transferred by the first robot singulator, and a second picking area from which parcels of the bulk flow of parcels can be engaged and transferred by the second robot singulator;

a first place conveyor positioned downstream of the picking area and configured to receive parcels transferred by the first robot singulator from the first picking area;

a second place conveyor positioned downstream of the picking area and the first place conveyor, the second place conveyor configured to receive parcels transferred by the second robot singulator from the second picking area, and further configured to receive parcels from the first place conveyor; and a buffering conveyor positioned between the first place conveyor and the second place conveyor for regulating a rate at which parcels offloaded by the first place conveyor are transferred to the second place conveyor.

10. The conveyor system according to claim 9, and further comprising:
a vision and control subsystem operably connected to the first robot singulator, the second robot singulator, and the buffering conveyor, the vision and control subsystem including
a first camera for acquiring one or more images of the picking area and any parcels located in the picking area, and
a controller including a processor for executing instructions stored in a memory component to (i) receive and process image data corresponding to an initial image of the picking area acquired by the first camera, (ii) selectively communicate instructions to the first robot singulator which cause the first robot singulator to engage and transfer parcels of the bulk flow of parcels positioned in the first picking area to the first place conveyor, (iii) selectively communicate instructions to the second robot singulator which cause the second robot singulator to engage and transfer parcels positioned in the second picking area to the second place conveyor, and (iv) selectively communicate instructions to the buffering conveyor which cause the buffering conveyor to index and transfer parcels from the first place conveyor to the second place conveyor.

11. The conveyor system according to claim 9, wherein the first robot singulator and the second robot singulator are each a six-axis robotic arm.

12. The conveyor system according to claim 9, wherein the first picking area is aligned with the first place conveyor, and wherein the second picking area is aligned with the second place conveyor.

13. The conveyor system according to claim 9, wherein the first picking area is defined by a first section of a chute, and the second picking area is defined by a second section of the chute.

14. The conveyor system according to claim 9, wherein parcels are delivered to the first robot singulator and the second robot singulator in a first direction, and wherein the first place conveyor and the second place conveyor receive and transfer parcels away from the first robot singulator and the second robot singulator in a second direction, which is substantially perpendicular to the first direction.

15. The conveyor system according to claim 10, wherein the buffering conveyor comprises multiple buffering conveyors, with each of the multiple buffering conveyors being independently controlled by the vision and control subsystem to control movement of parcels from the first place conveyor to the second place conveyor.

16. The conveyor system according to claim 9, and further comprising an additional conveying module incorporated into the second place conveyor which is configured both to convey parcels along a longitudinal axis of the second place conveyor and to selectively convey parcels in a transverse direction relative to the longitudinal axis.

* * * * *